US011582582B2

(12) United States Patent
Balasubramanian et al.

(10) Patent No.: US 11,582,582 B2
(45) Date of Patent: Feb. 14, 2023

(54) POSITION ESTIMATION OF A PEDESTRIAN USER EQUIPMENT

(71) Applicant: QUALCOMM Incorporated, San Diego, CA (US)

(72) Inventors: Anantharaman Balasubramanian, San Diego, CA (US); Kapil Gulati, Belle Mead, NJ (US); Chang-Sik Choi, Hillsborough, NJ (US)

(*) Notice: Subject to any disclaimer, the term of this patent is extended or adjusted under 35 U.S.C. 154(b) by 29 days.

(21) Appl. No.: 17/145,624

(22) Filed: Jan. 11, 2021

(65) Prior Publication Data
US 2021/0385619 A1    Dec. 9, 2021

Related U.S. Application Data

(60) Provisional application No. 63/035,383, filed on Jun. 5, 2020.

(51) Int. Cl.
*H04W 24/00*    (2009.01)
*H04W 4/029*    (2018.01)
*H04W 4/02*    (2018.01)
*H04W 4/46*    (2018.01)

(52) U.S. Cl.
CPC .......... *H04W 4/029* (2018.02); *H04W 4/023* (2013.01); *H04W 4/46* (2018.02)

(58) Field of Classification Search
CPC ....... H04W 4/029; H04W 4/023; H04W 4/46; H04W 64/00; H04W 4/02; H04W 4/40; G01S 5/0289; G01S 5/0036; G01S 5/0072; G08G 1/162
See application file for complete search history.

(56) References Cited

U.S. PATENT DOCUMENTS

| 2017/0092126 A1 | 3/2017 | Oshida et al. |
| 2018/0035255 A1* | 2/2018 | Kordybach ............. H04W 4/46 |
| 2019/0268726 A1 | 8/2019 | Jiang et al. |

FOREIGN PATENT DOCUMENTS

WO    WO-2019213763 A1 * 11/2019    ............. G01S 13/86

OTHER PUBLICATIONS

International Search Report and Written Opinion—PCT/US2021/032029—ISA/EPO—dated Aug. 3, 2021.

* cited by examiner

*Primary Examiner* — Erika A Washington

(57) ABSTRACT

In an aspect, a UE (e.g., PUE or VUE) performs one or more sidelink positioning measurements on a first sidelink positioning signal between PUE and a VUE. The UE transmits measurement data based on the one or more sidelink positioning measurements to a RSU. The RSU receives the measurement data and determines a positioning estimate for the PUE. The RSU transmits the positioning estimate to the PUE, at least one VUE, or a combination thereof.

69 Claims, 12 Drawing Sheets

POSITION ESTIMATION OF A PEDESTRIAN USER EQUIPMENT

CROSS-REFERENCE TO RELATED APPLICATION

The present Application for Patent claims the benefit of U.S. Provisional Application No. 63/035,383, entitled "POSITION ESTIMATION OF A PEDESTRIAN USER EQUIPMENT", filed Jun. 5, 2020, assigned to the assignee hereof and hereby expressly incorporated by reference herein in its entirety.

BACKGROUND OF THE DISCLOSURE

1. Field of the Disclosure

Aspects of the disclosure relate generally to wireless communications, and more particularly to position estimation of a pedestrian user equipment (PUE).

2. Description of the Related Art

Many vehicles manufactured today are equipped with numerous sensors, including cameras, radar, Light Detection and Ranging (LIDAR) and ultrasound. These sensors are used to detect environment about the car, including other vehicles, obstacles and vulnerable road users (VRUs), such as pedestrians, cyclists, etc. To address instances where vehicle sensors are subject to occlusion, or objects are beyond the range of a vehicle's sensors, standards bodies, including SAE, ETSI-ETS and CSAE, are defining application-layer standards for vehicle-to-everything (V2X) sensor-sharing, or the dissemination of detected vehicles and/or objects. These standards are applicable to any V2X entity, including vehicles and infrastructure Road Side Units (RSUs).

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any specific aspect. Accordingly, the following summary has the sole purpose to present certain concepts relating to one or more aspects relating to the mechanisms disclosed herein in a simplified form to precede the detailed description presented below.

An embodiment is directed to a method of operating a wireless node, comprising receiving measurement data associated with one or more sidelink positioning measurements between a pedestrian user equipment (PUE) and one or more vehicle user equipments (VUEs), determining a positioning estimate for the PUE based at least in part on the received measurement data, and transmitting the positioning estimate to the PUE, at least one VUE, or a combination thereof.

Another embodiment is directed to a method of operating a user equipment (UE), comprising performing one or more sidelink positioning measurements on a first sidelink positioning signal between a pedestrian user equipment (PUE) and a vehicle user equipment (UE), transmitting measurement data based on the one or more sidelink positioning measurements to a wireless node, and receiving a positioning estimate for the PUE from the wireless node based in part upon the transmitted measurement data.

Another embodiment is directed to a wireless node, comprising means for receiving measurement data associated with one or more sidelink positioning measurements between a pedestrian user equipment (PUE) and one or more vehicle user equipments (VUEs), means for determining a positioning estimate for the PUE based at least in part on the received measurement data, and means for transmitting the positioning estimate to the PUE, at least one VUE, or a combination thereof.

Another embodiment is directed to a user equipment (UE), comprising means for performing one or more sidelink positioning measurements on a first sidelink positioning signal between a pedestrian user equipment (PUE) and a vehicle user equipment (UE), means for transmitting measurement data based on the one or more sidelink positioning measurements to a wireless node, and means for receiving a positioning estimate for the PUE from the wireless node based in part upon the transmitted measurement data.

Another embodiment is directed to a wireless node, comprising a memory, at least one communications interface, and at least one processor communicatively coupled to the memory, the at least one communications interface, the at least one processor configured to receive measurement data associated with one or more sidelink positioning measurements between a pedestrian user equipment (PUE) and one or more vehicle user equipments (VUEs), determine a positioning estimate for the PUE based at least in part on the received measurement data, and transmit the positioning estimate to the PUE, at least one VUE, or a combination thereof.

Another embodiment is directed to a user equipment (UE), comprising a memory, at least one communications interface, and at least one processor communicatively coupled to the memory, the at least one communications interface, the at least one processor configured to perform one or more sidelink positioning measurements on a first sidelink positioning signal between a pedestrian user equipment (PUE) and a vehicle user equipment (UE), transmit measurement data based on the one or more sidelink positioning measurements to a wireless node, and receive a positioning estimate for the PUE from the wireless node based in part upon the transmitted measurement data.

Another embodiment is directed to a non-transitory computer-readable medium containing instructions stored thereon, which, when executed by a wireless node, cause the wireless node to perform operations, the instructions comprising at least one instruction to cause the wireless node to receive measurement data associated with one or more sidelink positioning measurements between a pedestrian user equipment (PUE) and one or more vehicle user equipments (VUEs), at least one instruction to cause the wireless node to determine a positioning estimate for the PUE based at least in part on the received measurement data, and at least one instruction to cause the wireless node to transmit the positioning estimate to the PUE, at least one VUE, or a combination thereof.

Another embodiment is directed to a non-transitory computer-readable medium containing instructions stored thereon, which, when executed by a user equipment (UE, cause the UE to perform operations, the instructions comprising at least one instruction to cause the UE to perform one or more sidelink positioning measurements on a first sidelink positioning signal between a pedestrian user equipment (PUE) and a vehicle user equipment (UE), at least one instruction to cause the UE to transmit measurement data based on the one or more sidelink positioning measurements to a wireless node, and at least one instruction to cause the UE to receive a positioning estimate for the PUE from the wireless node based in part upon the transmitted measurement data.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure relate generally to a method and apparatus related to a vehicle request for sensor data with at least one sensor data filtering condition. In an aspect, a vehicle apparatus monitors, via a set of sensors communicatively coupled to the vehicle apparatus, a field of view (FOV) of the vehicle apparatus. The vehicle apparatus transmits, based on the monitoring, a first message that requests sensor data from one or more neighboring communication devices and indicates at least one sensor data filtering condition for the requested sensor data. In a further aspect, at least one of the neighboring communication devices receives the first message, and determines whether sensor data is available which satisfies the at least one sensor data filtering condition for the requested sensor data. If so, a second message is transmitted back to the vehicle apparatus that includes some or all of the requested sensor data. In a specific example, the at least one sensor data filtering condition may comprise an indication of one or more occluded regions in the FOV of the vehicle apparatus.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1A:
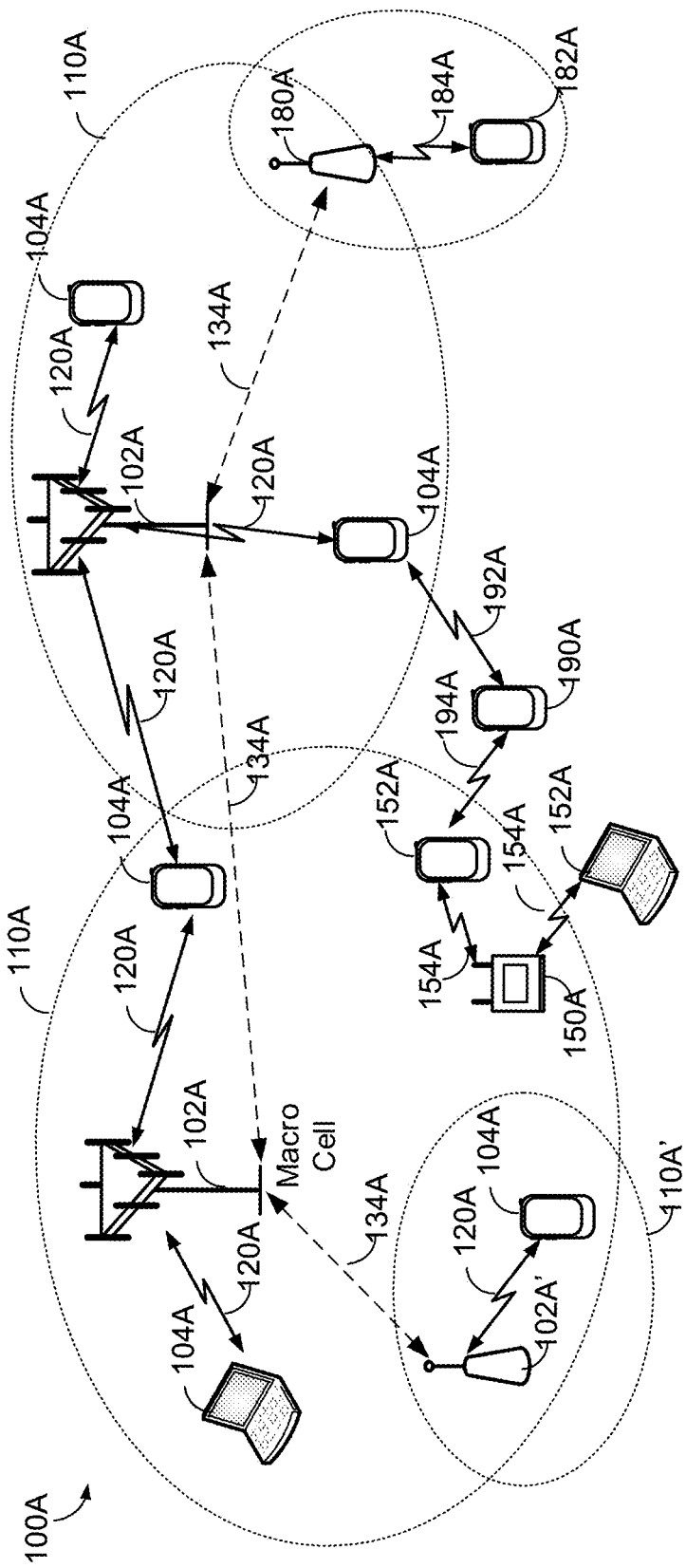
FIG. 1A illustrates an exemplary wireless communications system, according to various aspects.

According to various aspects, FIG. 1A illustrates an exemplary wireless communications system 100A. The wireless communications system 100A (which may also be referred to as a wireless wide area network (WWAN)) may include various base stations 102A and various UEs 104A. The base stations 102A may include macro cells (high power cellular base stations) and/or small cells (low power cellular base stations), wherein the macro cells may include Evolved NodeBs (eNBs), where the wireless communications system 100A corresponds to an LTE network, or gNodeBs (gNBs), where the wireless communications system 100A corresponds to a 5G network or a combination of both, and the small cells may include femtocells, picocells, microcells, etc.

The base stations 102A may collectively form a Radio Access Network (RAN) and interface with an Evolved Packet Core (EPC) or Next Generation Core (NGC) through backhaul links. In addition to other functions, the base stations 102A may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102A may communicate with each other directly or indirectly (e.g., through the EPC/NGC) over backhaul links 134A, which may be wired or wireless.

The base stations 102A may wirelessly communicate with the UEs 104A. Each of the base stations 102A may provide communication coverage for a respective geographic coverage area 110A. In an aspect, although not shown in FIG. 1A, geographic coverage areas 110A may be subdivided into a plurality of cells (e.g., three), or sectors, each cell corresponding to a single antenna or array of antennas of a base station 102A. As used herein, the term "cell" or "sector" may correspond to one of a plurality of cells of a base station 102A, or to the base station 102A itself, depending on the context.

While neighboring macro cell geographic coverage areas 110A may partially overlap (e.g., in a handover region), some of the geographic coverage areas 110A may be substantially overlapped by a larger geographic coverage area 110A. For example, a small cell base station 102A' may have a geographic coverage area 110A' that substantially overlaps with the geographic coverage area 110A of one or more macro cell base stations 102A. A network that includes both small cell and macro cells may be known as a heterogeneous network. A heterogeneous network may also include Home eNBs (HeNBs), which may provide service to a restricted group known as a closed subscriber group (CSG). The communication links 120A between the base stations 102A and the UEs 104A may include uplink (UL) (also referred to as reverse link) transmissions from a UE 104A to a base station 102A and/or downlink (DL) (also referred to as forward link) transmissions from a base station 102A to a UE 104A. The communication links 120A may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100A may further include a wireless local area network (WLAN) access point (AP) 150A in communication with WLAN stations (STAs) 152A via communication links 154A in an unlicensed frequency spectrum (e.g., 5 GHz). When communicating in an unlicensed frequency spectrum, the WLAN STAs 152A and/or the WLAN AP 150A may perform a clear channel assessment (CCA) prior to communicating in order to determine whether the channel is available.

The small cell base station 102A' may operate in a licensed and/or an unlicensed frequency spectrum. When operating in an unlicensed frequency spectrum, the small cell base station 102A' may employ LTE or 5G technology and use the same 5 GHz unlicensed frequency spectrum as used by the WLAN AP 150A. The small cell base station 102A', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100A may further include a mmW base station 180A that may operate in mmW frequencies and/or near mmW frequencies in communication with a UE 182A. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave (mmW). Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180A may utilize beamforming 184A with the UE 182A to compensate for the extremely high path loss and short range. Further, it will be appreciated that in alternative configurations, one or more base stations 102A may also transmit using mmW or near mmW and beamforming. Accordingly, it will be appreciated that the foregoing illustrations are merely examples and should not be construed to limit the various aspects disclosed herein.

The wireless communications system 100A may further include one or more UEs, such as UE 190A, that connects indirectly to one or more communication networks via one or more device-to-device (D2D) peer-to-peer (P2P) links. In the embodiment of FIG. 1A, UE 190A has a D2D P2P link 192A with one of the UEs 104A connected to one of the base stations 102A (e.g., through which UE 190A may indirectly obtain cellular connectivity) and a D2D P2P link 194A with WLAN STA 152A connected to the WLAN AP 150A (through which UE 190A may indirectly obtain WLAN-based Internet connectivity). In an example, the D2D P2P links 192A-194A may be supported with any well-known D2D radio access technology (RAT), such as LTE Direct (LTE-D), WiFi Direct (WiFi-D), BLUETOOTH, and so on.

In some systems, there are six levels that have been defined to achieve full automation. At Level 0, the human driver does all the driving. At Level 1, an Advanced Driver Assistance System (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human occupant need not pay attention in those circumstances. At Level 5, an ADS on the vehicle can do all the driving in all circumstances. The human occupants are just passengers and need never be involved in driving.

These and other safety technologies use a combination of hardware (sensors, cameras, and radar) and software to help vehicles identify certain safety risks so they can warn the driver to act (in the case of an ADAS), or act themselves (in the case of an ADS), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize radio frequency (RF) waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Figure 1B:
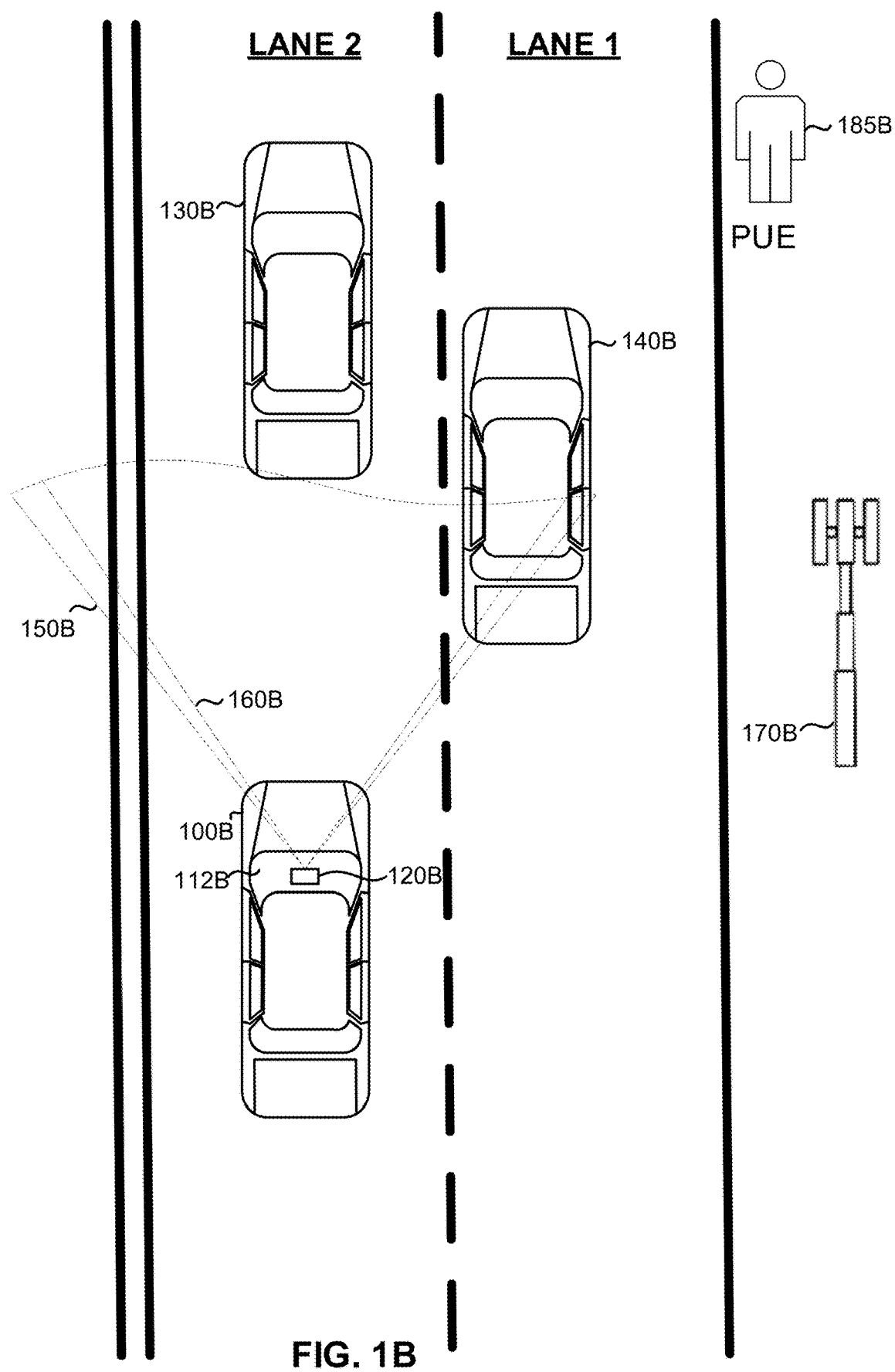
FIG. 1B is a top view of a vehicle employing an integrated radar-camera sensor behind the windshield, according to various aspects of the disclosure.

Referring now to FIG. 1B, a vehicle 100B is illustrated that includes a radar-camera sensor module 120B located in an interior compartment of the vehicle 100B behind a windshield 112B. The radar-camera sensor module 120B includes a radar sensor component configured to transmit radar signals through the windshield 112B in a horizontal coverage zone 150B (shown by dashed lines), and receive reflected radar signals that are reflected off of any objects within the coverage zone 150B. The radar-camera sensor module 120B further includes a camera component for capturing images based on light waves that are seen and captured through the windshield 112 in a horizontal coverage zone 160B (shown by dashed lines). The respective coverage zones 150B and 160B form part of the field of view (FOV) of the vehicle 100B. In some cases, each sensor that is communicatively coupled (e.g., mounted on) a respective vehicle may be characterized as having its own FOV, each of which constitutes an example of a FOV for the vehicle 100B. In this case, the vehicle 100B may be characterized as having multiple FOVs (e.g., one for each sensor). Alternatively, sensors may be arranged in groups (e.g., one or more sensor groups), with each sensor group characterized as having its own FOV, each of which constitutes an example of a FOV for the vehicle 100B. Alternatively, the FOVs of individual sensors and/or sensor groups may be aggregated (e.g., so that an occluded region in one sensor's FOV can be patched by another sensor's FOV via the aggregation). Accordingly, as used herein, a FOV of the vehicle 100B may reference either a sensor-specific or sensor group-specific FOV, or alternatively an aggregation of FOVs from various sensors and/or sensor groups.

Although FIG. 1B illustrates an example in which the radar sensor component and the camera component are collocated components in a shared housing, as will be appreciated, they may be separately housed in different locations within the vehicle 100B. For example, the camera part of the radar-camera sensor module 120B may be located as shown in FIG. 1B, and the radar sensor part of the radar-camera sensor module 120B may be located in the grill or front bumper of the vehicle 100B. Additionally, although FIG. 1B illustrates the radar-camera sensor module 120B located behind the windshield 112B, it may instead be located in a rooftop sensor array, or elsewhere. Further, although FIG. 1B illustrates only a single radar-camera sensor module 120B, as will be appreciated, the vehicle 100B may have multiple radar-camera sensor modules 120B pointed in different directions (to the sides, the front, the rear, etc.). The various radar-camera sensor modules 120B may be under the "skin" of the vehicle (e.g., behind the windshield 112B, door panels, bumpers, grills, etc.) or within a rooftop sensor array.

The radar-camera sensor module 120B may detect one or more (or none) objects relative to the vehicle 100B. In the example of FIG. 1B, there are two objects, vehicles 130B and 140B, within the horizontal coverage zones 150B and 160B that the radar-camera sensor module 120B can detect. The radar-camera sensor module 120B may estimate parameters of the detected object(s), such as the position, range, direction, speed, size, classification (e.g., vehicle, pedestrian, road sign, etc.), and the like. The radar-camera sensor module 120B may be employed onboard the vehicle 100B for automotive safety applications, such as adaptive cruise control (ACC), forward collision warning (FCW), collision mitigation or avoidance via autonomous braking, lane departure warning (LDW), and the like. More specifically, the radar-camera sensor module 120 may be part of an onboard unit (OBU) (alternatively referred to as an on-board computer (OBC)), which is described in more detail below with respect to FIG. 2.

In one or more aspects, co-locating the camera and radar sensor permits these components to share electronics and signal processing, and in particular, enables early radar-camera data fusion. For example, the radar sensor and camera may be integrated onto a single board. A joint radar-camera alignment technique may be employed to align both the radar sensor and the camera. However, collocation of the radar sensor and camera is not required to practice the techniques described herein.

In the aspect of FIG. 1B, vehicles 100B, 130B and 140B are traveling in the same direction along a road in proximity to a roadside unit (RSU) 170B, whereby vehicle 140B is in a first lane ("Lane 1") and vehicles 100B and 130B are in a second lane ("Lane 2"). The RSU 170B may correspond to one of a plurality of fixed reference nodes that are deployed along various roadways. RSUs may form part of a Vehicular ad-hoc networks (VANET) and may be configured for direct communication with vehicles via a vehicle-to-vehicle (V2V) communications protocol or vehicle-to-everything (V2X) communications protocol, while further being connected to one or more communication networks (e.g., wireless communications system 100A of FIG. 1A) via a wired or wireless backhaul connection. In an example, the RSU 170B may correspond to a small cell or an access point as described above with respect to the wireless communications system 100A of FIG. 1A. In some aspects, the RSU 170B may be implemented as a vehicle management entity that manages (or coordinates actions) between the neighboring vehicles 100B, 130B and 140B. The RSU 170B may be equipped with various functionalities, including but not limited to short-range communications (e.g., 5.9 GHz Direct Short Range Communications (DSRC), non-DSRC technologies as means of facilitating communication for vehicle-to-vehicle (V2V) and/or vehicle-to-infrastructure (V21) applications, etc.), location-detection (e.g., GPS, etc.), communicative support functions (e.g., a WiFi hotspot, etc.), navigational support functions (e.g., local map data, Signal Phase and Timing (SPaT) information for intersection-based applications and localized roadway warnings, etc.), and so on.

Referring to FIG. 1B, in one aspect, the vehicles 130B and 140B may be similarly provisioned with respective radar-camera sensor modules 120B, and may be capable of direct vehicle-to-vehicle (V2V) communication via respective communication interfaces. However, it is also possible for only one or even none of vehicles 130B and 140B to be equipped with such 'smart' vehicle technology.

Referring to FIG. 1B, a vulnerability road user (VRU) is depicted, denoted as VRU 1. VRU 1 may correspond to an individual that is either not on a motorized vehicle (e.g., a person walking or bicycling on a sidewalk or bike lane, etc.), or a motorized vehicle with limited operability (e.g., a scooter, a motorcycle that is not turned on, etc.). It is assumed that VRU 1 is operating a user equipment (e.g., a phone, tablet computer, wearable device such as a smart watch, smart glasses or head mounted display, smart clothing, headset, etc.), referred to herein as a pedestrian user equipment (PUE) 185B.

Figure 2:
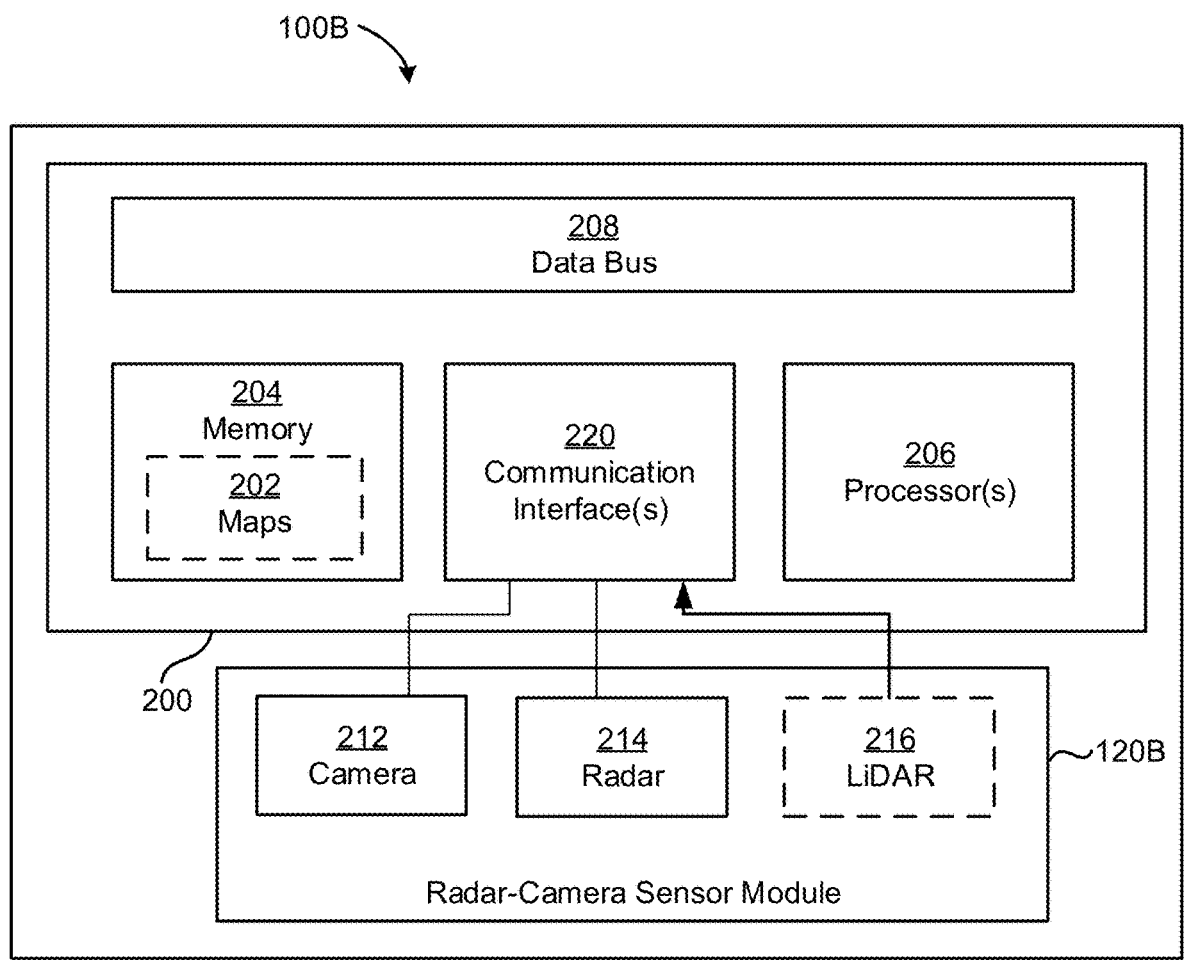
FIG. 2 illustrates an on-board unit (OBU) computer architecture, according to various aspects of the disclosure.

FIG. 2 illustrates an on-board unit (OBU) 200 of the vehicle 100B of FIG. 1B, according to various aspects. In an aspect, the OBU 200 may be referred to herein as a vehicle apparatus, and may be part of an ADAS or ADS. The OBU 200 includes a non-transitory computer-readable storage medium, i.e., memory 204, and one or more processors 206 in communication with the memory 204 via a data bus 208. The memory 204 includes one or more storage modules storing computer-readable instructions executable by the processor(s) 206 to perform the functions of the OBU 200 described herein. As used herein, the vehicle 100B and its respective OBU 200 may be referred to herein as a vehicle user equipment (VUE) 100B. While depicted in some embodiments as a road motor vehicle, the VUE 100B may be associated with any type of vehicle in other implementations (e.g., bicycles, robots, drones, etc.).

One or more radar-camera sensor modules 120B are coupled to the OBU 200 (only one is shown in FIG. 2 for simplicity). In some aspects, the radar-camera sensor module 120B includes at least one camera 212 (e.g., a forward-facing camera as shown via the coverage zone 160B in FIG. 1B), at least one radar sensor 214, and an optional Light Detection and Ranging (LIDAR) sensor 216. While not shown expressly, the radar-camera sensor module 120B may further optionally include a Sound Navigation and Ranging (SONAR) detector, a Radio Detection and Ranging (RADAR) detector, and/or an infrared detector. The OBU 200 also includes one or more communication interfaces 220 connecting the processor(s) 206, by way of the data bus 208, to the radar-camera sensor module 120B, other vehicle sub-systems (not shown), and in some cases, wireless communication networks (not shown), such as wireless local area networks (WLANs), global positioning systems (GPS) networks, cellular telecommunication networks, and the like. In an example, the one or more communication interfaces 220 may include a network interface (e.g., a wireless LTE, 5G NR, a wired backhaul connection to a core network component, etc.) to connect to one or more network access points or base stations (e.g., cellular base stations, RSUs, etc.), and a second interface (e.g., V2X, 5.9 GHz DSRC, etc.) to connect directly to nearby (or neighboring) vehicles. In an example, V2X connections may be implemented via unicast, multicast or broadcast protocols. The various V2X connections described below may be implemented in accordance with any one of these protocols.

In an aspect, the OBU 200 may utilize the communication interfaces 220 to download one or more maps 202 that can then be stored in memory 204 and used for vehicle navigation. Map(s) 202 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by vehicle 100B. Map(s) 202 may also provide electronic horizon predictive awareness, which enables the vehicle 100 to know what lies ahead.

In an aspect, the camera 212 may capture image frames of the scene within the viewing area of the camera 212 (as illustrated in FIG. 1B as horizontal coverage zone 160B) at some periodic rate. Likewise, the radar sensor 214 may capture radar frames of the scene within the viewing area of the radar sensor 214 (as illustrated in FIG. 1B as horizontal coverage zone 150B) at some periodic rate. The periodic rates at which the camera 212 and the radar sensor 214 capture their respective frames may be the same or different. In an aspect, each camera and radar frame may be time-stamped. Thus, where the periodic rates are different, the timestamps can be used to select simultaneously, or nearly simultaneously, captured camera and radar frames for further processing (e.g., fusion).

Figure 3:
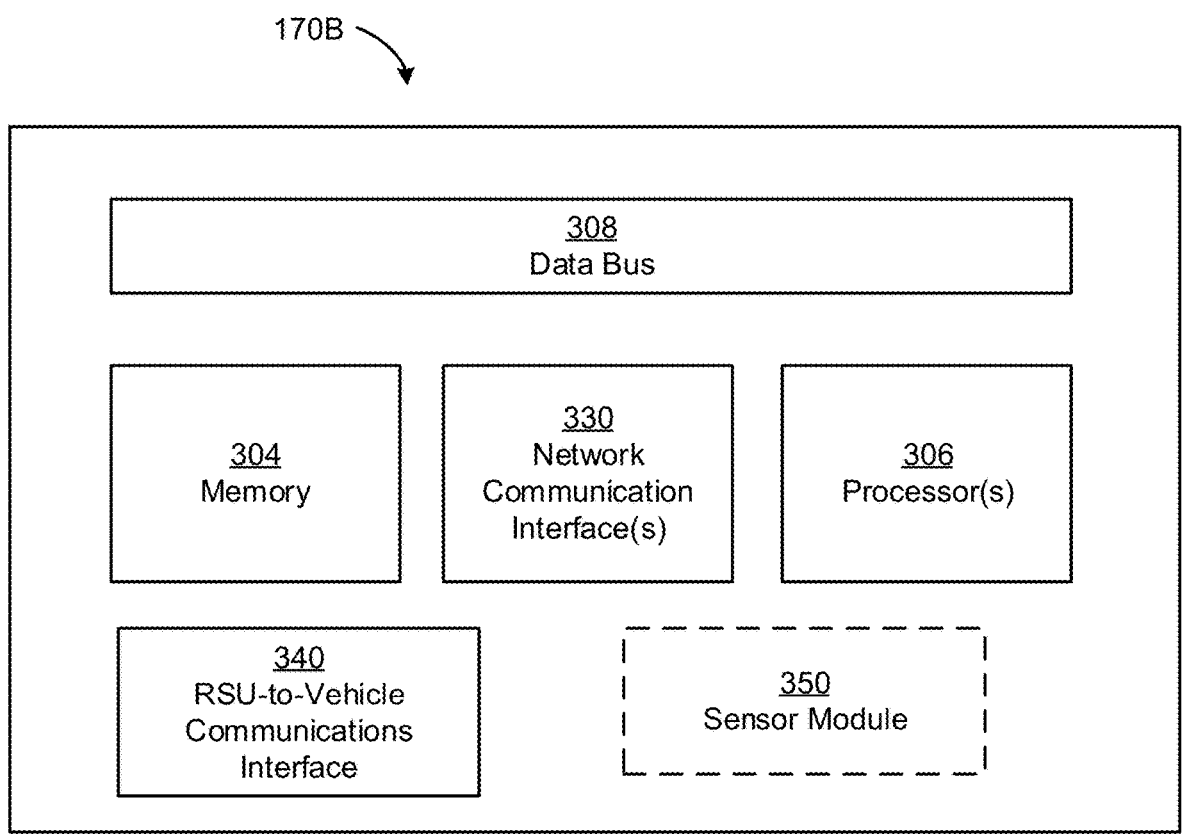
FIG. 3 illustrates components of a Road Side Unit (RSU) according to various aspects.

FIG. 3 illustrates components of the RSU 170B of FIG. 1B according to various aspects. In an aspect, the RSU 170B is configured with a memory 304, and one or more processors 306 in communication with the memory 304 via a data bus 308. The RSU 170B further includes one or more network communication interfaces 330, which may be used to communicatively couple the RSU 170B to a communications network (e.g., a macro base station, another RSU, a core network component, etc.) via a wired or wireless backhaul connection. The RSU 170B is further configured with a RSU-to-UE communications interface 340 (e.g., an RSU-to-VUE interface such as V2X, 5.9 GHz DSRC, etc., or a more general RSU-to-UE interface such as WWAN or WLAN interface, e.g., LTE, 5G NR, 802.11ac, etc.) for direct RSU-to-UE communication. The RSU 170B is also optionally configured with a sensor module 350, which may be configured with any combination of camera(s), radar, LIDAR, GPS, etc. As will be described below in more detail, in certain aspects the sensor module 350 may be used to scan the locations of a set of neighboring vehicles to obtain sensor data that replaces and/or supplements sensor data measured or derived by one or more of the neighboring vehicles.

Figure 4:
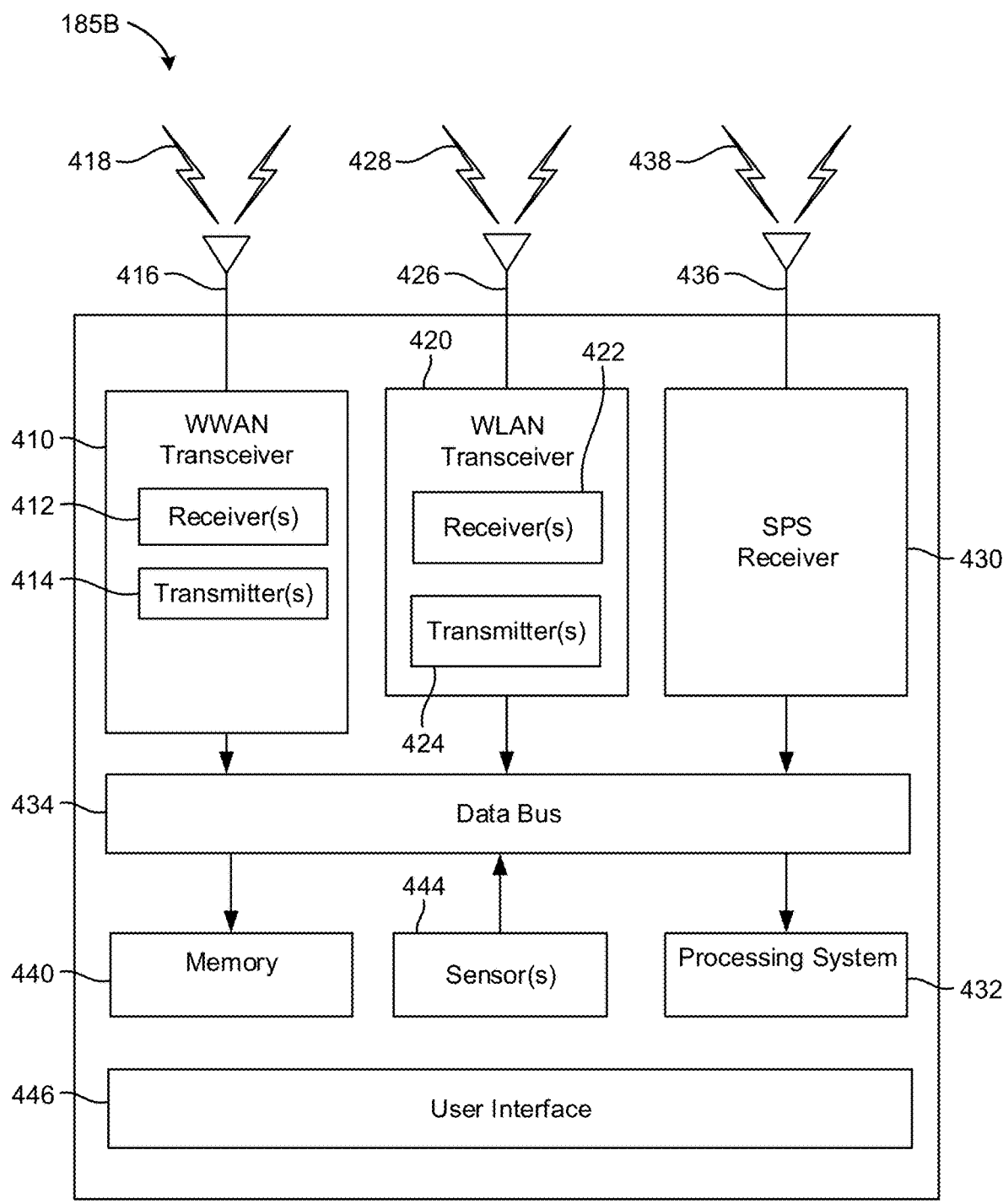
FIG. 4 illustrates several sample components (represented by corresponding blocks) that may be incorporated into a pedestrian user equipment (PUE) in accordance with an embodiment of the disclosure.

FIG. 4 illustrates several sample components (represented by corresponding blocks) that may be incorporated into the PUE 185B in accordance with an embodiment of the disclosure. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The PUE 185B includes a wireless wide area network (WWAN) transceiver 410 configured to communicate via one or more wireless communication networks (not shown), such as an NR network, an LTE network, a GSM network, and/or the like. The WWAN transceiver 410 may be connected to one or more antennas 416, for communicating with other network nodes, such as other UEs, VUEs, RSUs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 410 may be variously configured for transmitting and encoding signals 418 (e.g., messages, indications, information, and so on), respectively, and, conversely, for receiving and decoding signals 418 (e.g., messages, indications, information, pilots, and so on), respectively, in accordance with the designated RAT. Specifically, the transceivers 410 include one or more transmitters 414, for transmitting and encoding signals 418, and one or more receivers 412, for receiving and decoding signals 418.

The PUE 185B also includes, at least in some cases, wireless local area network (WLAN) transceivers 420. The WLAN transceivers 420 may be connected to one or more antennas 426 for communicating with other network nodes, such as other UEs, VUEs, RSUs, access points, base stations, etc., via at least one designated RAT (e.g., WiFi, LTE-D, Bluetooth®, etc.) over a wireless communication medium of interest. The WLAN transceivers 420 may be variously configured for transmitting and encoding signals 428 (e.g., messages, indications, information, and so on), and, conversely, for receiving and decoding signals 428 (e.g., messages, indications, information, pilots, and so on), in accordance with the designated RAT. Specifically, the transceivers 420 include one or more transmitters 424 for transmitting and encoding signals 428 and one or more receivers 422 for receiving and decoding signals 428.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 416), such as an antenna array, that permits the respective apparatus to perform transmit "beamforming," as described herein. Similarly, a receiver may include or be coupled to a plurality of antennas (e.g., antennas 416), such as an antenna array, that permits the respective apparatus to perform receive beamforming, as described herein. In an aspect, the transmitter and receiver may share the same plurality of antennas (e.g., antennas 416), such that the respective apparatus can only receive or transmit at a given time, not both at the same time. A wireless communication device (e.g., one or both of the transceivers 410 and 420) of the PUE 185B may also comprise a network listen module (NLM) or the like for performing various measurements.

The PUE 185B may also include, at least in some cases, satellite positioning systems (SPS) receiver 430. The SPS receiver 430 may be connected to one or more antennas 436 for receiving SPS signals 438, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receiver 430 may comprise any suitable hardware and/or software for receiving and processing SPS signals 438. The SPS receiver 430 may request information and operations as appropriate from the other systems, and performs calculations necessary to determine the PUE's 185B position using measurements obtained by any suitable SPS algorithm.

The PUE 185B may also include other components that may be used in conjunction with the operations as disclosed herein. The PUE 185B includes processor circuitry implementing a processing system 432 for providing functionality relating to, for example, false base station (FBS) detection as disclosed herein and for providing other processing functionality. In an aspect, the processing system 432 may include, for example, one or more general purpose processors, multi-core processors, ASICs, digital signal processors (DSPs), field programmable gate arrays (FPGA), or other programmable logic devices or processing circuitry.

The PUE 185B may include memory circuitry implementing memory component 440 for maintaining information (e.g., information indicative of reserved resources, thresholds, parameters, and so on). The PUE 185B may include one or more sensors 444 coupled to the processing system 432 to provide movement and/or orientation information that is independent of motion data derived from signals received by the WWAN transceiver 410, the WLAN transceiver 420, and/or the GPS receiver 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in 2D and/or 4D coordinate systems.

In addition, the PUE 185B includes a user interface 446 for providing indications (e.g., audible and/or visual indications) to a user and/or for receiving user input (e.g., upon user actuation of a sensing device such a keypad, a touch screen, a microphone, and so on).

At the PUE 185B, the receiver 412 receives a signal through its respective antenna(s) 416. The receiver 412 recovers information modulated onto an RF carrier and provides the information to the processing system 432. The transmitter 414 and the receiver 412 implement Layer-1 functionality associated with various signal processing functions. The receiver 412 may perform spatial processing on the information to recover any spatial streams destined for the PUE 185B. If multiple spatial streams are destined for the PUE 185B, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by a base station (e.g., RSU 170B). These soft decisions may be based on channel estimates computed by a channel estimator. The soft decisions are then decoded and de-interleaved to recover the data and control signals that were originally transmitted by a base station (e.g., RSU 170B) on the physical channel. The data and control signals are then provided to the processing system 432, which implements Layer-3 and Layer-2 functionality.

In the UL, the processing system 432 provides demultiplexing between transport and logical channels, packet reassembly, deciphering, header decompression, and control signal processing to recover IP packets from the core network. The processing system 432 is also responsible for error detection.

Similar to the functionality described in connection with the DL transmission by a base station (e.g., RSU 170B), the processing system 432 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by a base station may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

For convenience, the PUE 185B is shown in FIG. 4 as including various components that may be configured according to the various examples described herein. It will be appreciated, however, that the illustrated blocks may have different functionality in different designs.

The various components of the PUE 185B may communicate with each other over data bus(es) 434. The components of FIG. 4 may be implemented in various ways. In some implementations, the components of FIG. 4 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the PUE 185B (e.g., by execution of appropriate code and/or by appropriate configuration of processor components. For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing system 432, the transceivers 410 and 420, the memory component 440, etc. In some designs, the VUE 100B may be configured similarly to the PUE 185B as depicted in FIG. 4.

V2X positioning involves a VUE or PUE positioning itself using RSU(s) and/or other VUEs or PUEs that have accurate information of their own positioning. In a vehicle-to-pedestrian (V2P) system, it is important for the VUE to know its position as well as the position of the PUE to avoid potential collision. In some designs, it may be possible for the VUE to knows its position more accurately than a respective PUE due to higher quality sensors that the VUE may be equipped with. Alternately, the VUE could obtain assistance from nearby RSU(s) to get an accurate position of the VUE. However, it may be relatively difficult for the VUE to obtain accurate positioning of the PUE (e.g., because the position information, such as GPS-based location data, provided by the PUE may be error-prone in certain environments such as a heavy urban environment, etc.).

Figure 5:
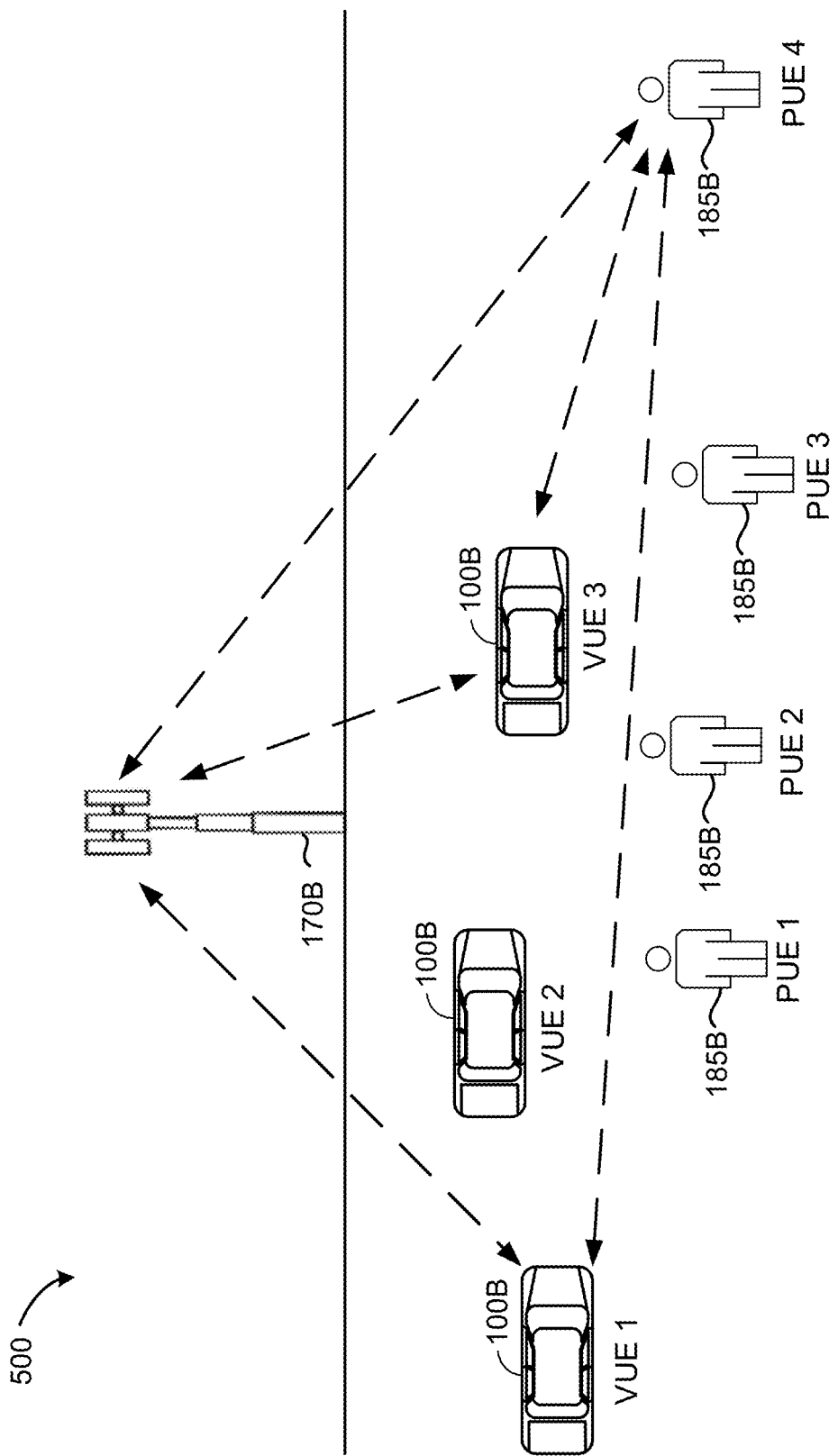
FIG. 5 illustrates a traffic scenario in accordance with an embodiment of the disclosure

Alternatively, the ranging measurements that the VUE obtains from the PUE may be inaccurate due to minimal angular changes (e.g., when the VUE is far off from the PUE), as shown in FIG. 5. FIG. 5 illustrates a traffic scenario 500 in accordance with an embodiment of the disclosure. In FIG. 5, VUEs 1 ... 3 (e.g., each of which may be configured as VUE 100B of FIG. 2) are driving on a road proximate to RSU 170B and PUEs 1 ... 4 (e.g., each of which may be configured as PUE 185B of FIG. 4). As shown in FIG. 5, VUE 1 is further from PUE 4 than either VUE 2 or VUE 3, resulting in a ranging path 505 to PUE 4 with a narrower angle relatively to a ranging path 510 from VUE 3 to PUE 4. Hence, a ranging-based positioning estimate of PUE 4 is less accurate for VUE 1 as compared to VUE 3.

Embodiments of the disclosure are directed to based positioning for PUEs based at least in part upon measurement data (e.g., time-of-arrival (ToA) measurement data, Angle of Arrival (AoA) measurement data, Angle of Departure (AoD) measurement data, clock bias error, etc.) associated with sidelink positioning procedures that is relayed to a respective wireless node (e.g., RSU, or a lead UE, such as a lead VUE or lead PUE). In some designs, the wireless node may leverage the relayed measurement data to perform a more accurate positioning estimate than may be possible for particular VUEs on their own. Such an approach may provide the technical advantage of more accurate PUE positioning, which may improve road safety (e.g., particularly in urban environments, where there is a high density of PUEs).

Figure 6:
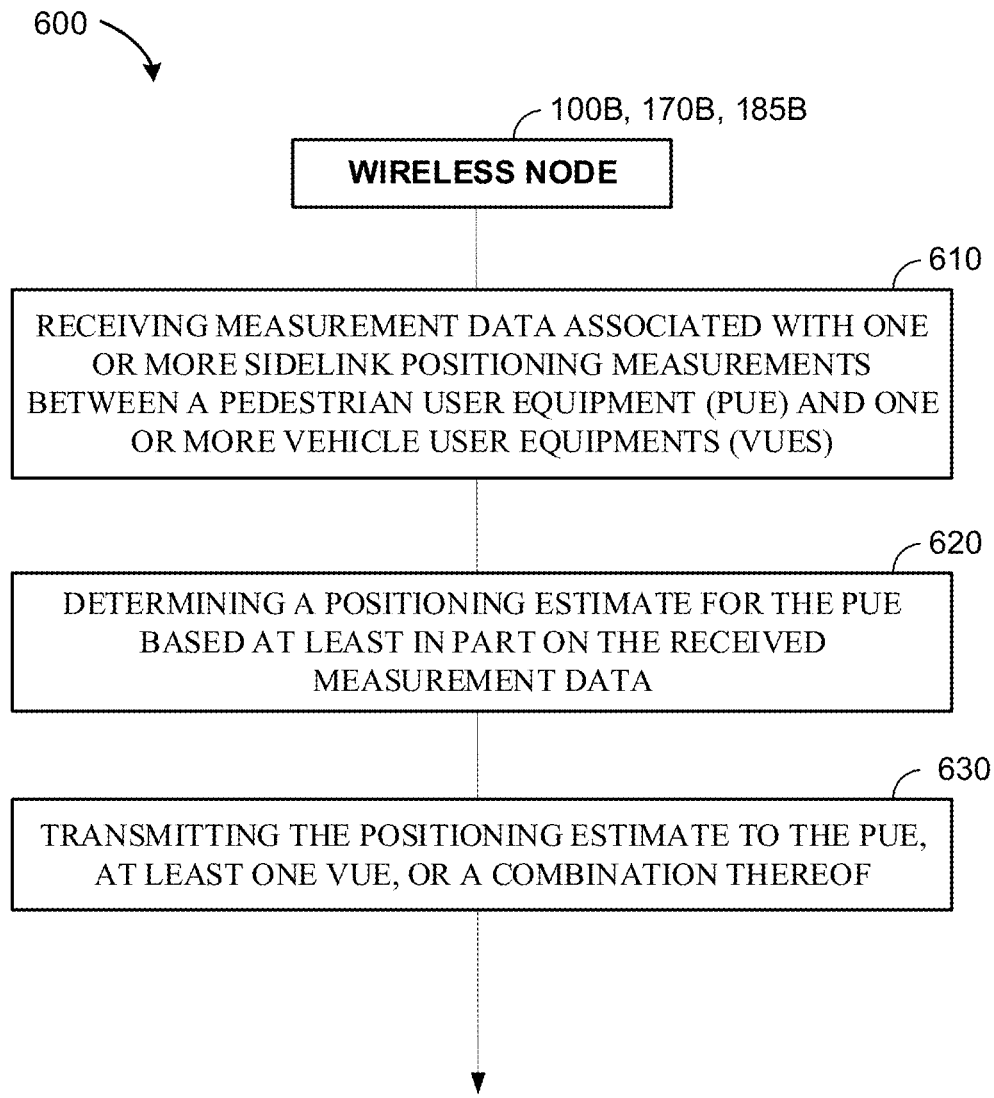
FIG. 6 is a flow diagram illustrating an example process of communication in accordance with an aspect of the present disclosure.

FIG. 6 is a flow diagram illustrating an example process 600 of communication in accordance with an aspect of the present disclosure. The process 600 may be performed by RSU 170B, or alternatively by a lead UE, such as a lead PUE 185B or lead VUE 100B. For example, of a proximate RSU is unavailable (e.g., not present or busy), a lead UE can be designated to perform the process of FIG. 6 rather than an infrastructure node such as RSU. In some designs, the wireless node that performs the process 600 of FIG. 6 may correspond to a fixed infrastructure component as shown in FIG. 1B. However, in other designs, RSU functionality may be integrated into a VUE. Accordingly, any device (e.g., infrastructure RSU, VUE, PUE, etc.) may perform the PUE location coordination functionality described below with respect to FIG. 6 in various aspects.

Referring to FIG. 6, at block 610, the wireless node (e.g., communications interface(s) 220, RSU-to-UE communications interface 340, receiver 412 or 422, etc.) receives measurement data (e.g., ToA measurement data, AoA measurement data, AoD measurement data, clock bias error, etc.) associated with one or more sidelink positioning measurements between a PUE and one or more VUEs. In some designs, the measurement data may comprise measurement data based on sidelink positioning measurement(s) performed by the PUE on sidelink positioning signal(s) transmitted from the VUE(s), or the measurement data may comprise measurement data based on sidelink positioning measurement(s) performed by the VUE(s) on sidelink positioning signal(s) transmitted from the PUE(s), or a combination thereof. In some designs, if the wireless node corresponds to the UE that performs the sidelink positioning measurement(s), then the reception at block 610 may correspond to an internal transfer of data across a respective data bus.

Referring to FIG. 6, at block 620, the wireless node (e.g., processor(s) 306) determines a positioning estimate for the PUE based at least in part on the received measurement data. In some designs, the wireless node (e.g., RSU 170B, etc.) may further perform its own positioning (or ranging) procedure with the PUE to improve the positioning estimate determined at 620. For example, the wireless node (e.g., RSU 170B, etc.) may transmit a positioning signal (e.g., a positioning reference signal or PRS) to the PUE, whereby the measurement data from the PUE further includes measurement information associated with one or more measurements of the positioning signal by the PUE. Alternatively, in another example, the wireless node (e.g., RSU 170B, etc.) may perform one or more positioning measurements on a positioning signal from the PUE (e.g., a sounding reference signal for positioning, or SRS-P), whereby the positioning estimate is further based on the one or more positioning measurement on the positioning signal. For example, the positioning estimate of block 620 may be implemented as a joint pedestrian localization using ranging and/or other measurements from multiple VUEs and/or PUEs (e.g., the ranging and/or other measurements from the PUE and VUE(s) are used by RSU 170B to jointly estimate the location of the PUE). In some designs, the positioning estimate determination at block 620 may be based at least in part upon one or more previous positioning estimates of the PUE (e.g., previous positioning estimates may indicate a trajectory of the PUE which impacts candidate location likelihoods associated with a current positioning estimate, etc.). In some designs, the positioning estimate for the PUE may be based upon additional measurement data (e.g., local sensor measurements at RSU 170B, such as RADAR, LIDAR, etc.).

Referring to FIG. 6, at block 630, the wireless node (e.g., communications interface(s) 220, RSU-to-vehicle communications interface 340, transmitter 414 or 424, etc.) may transmit the positioning estimate to the PUE, at least one VUE, or a combination thereof. Various triggering mechanisms for the transmitting of 630 may be used, as will be described in more detail below. In some designs, the at least one VUE to which the positioning estimate is transmitted at block 630 may correspond to some or all of the one or more VUEs from which measurement data is received at block 610. In other designs, the at least one VUE may comprise VUE(s) which do not provide such measurement data (e.g., where such VUE(s) may have disabled ranging equipment, or where the PUE is out of range of such ranging equipment such that the PUE is not yet inside of its respective FOV, etc.). In some designs, if the wireless node corresponds to a respective UE to which the positioning estimate is transmitted, then the transmission at block 630 may correspond to an internal transfer of data across a respective data bus.

Figure 7:
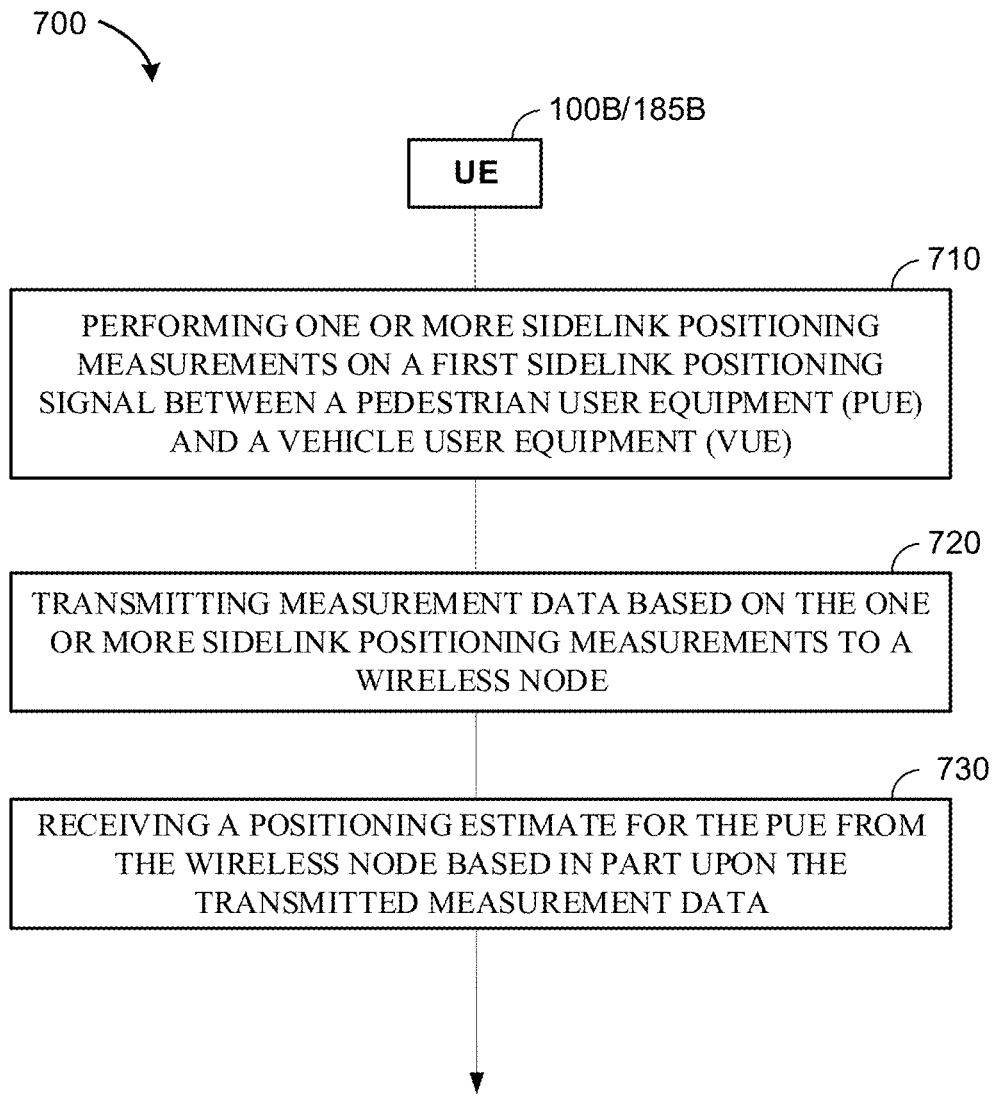
FIG. 7 is a flow diagram illustrating an example process of communication in accordance with another aspect of the present disclosure.

FIG. 7 is a flow diagram illustrating an example process 700 of communication in accordance with an aspect of the present disclosure. The process 700 is performed by a UE, which may correspond to either a VUE such a VUE 100B or a PUE such as PUE 185B.

Referring to FIG. 7, at block 710, the UE (e.g., communication interface(s) 220, receiver 412, receiver 422, etc.) may perform one or more sidelink positioning measurements on a first sidelink positioning signal between a PUE and a VUE. For example, if the UE corresponds to the PUE, then the PUE may perform sidelink positioning measurement(s) on the first sidelink positioning signal transmitted from the VUE at block 710, and if the UE corresponds to the VUE, then the VUE may perform sidelink positioning measurement(s) on the first sidelink positioning signal transmitted from the PUE at block 710. In some designs, the UE may also transmit a second sidelink positioning signal between a PUE and a VUE. In this case, the sidelink positioning procedure comprises a two-way ranging procedure.

Referring to FIG. 7, at block 720, the UE (e.g., communication interface(s) 220, transmitter 414, transmitter 424, etc.) may transmit measurement data (e.g., ToA measurement data, AoA measurement data, AoD measurement data, clock bias error, etc.) based on the one or more sidelink positioning measurements to a wireless node (e.g., RSU, lead PUE, lead VUE, etc.). In some designs, if the wireless node corresponds to the UE that performs the sidelink positioning measurement(s), then the transmission at block 720 may correspond to an internal transfer of data across a respective data bus.

Referring to FIG. 7, at block 730, the UE (e.g., communication interface(s) 220, receiver 412, receiver 422, etc.) may receive a positioning estimate for the PUE from the RSU based in part upon the transmitted measurement data. In some designs, if the UE performing the process of FIG. 7 is the lead UE (e.g., the wireless node), then the reception at block 730 may correspond to an internal transfer of data across a respective data bus (e.g., one logical part of the UE calculates the positioning estimate, which then logically transfers the positioning estimate to another logical part of the UE).

Referring to FIGS. 6-7, in some designs, the positioning estimate may be transported at block 630 or 730 via one or more unicast messages to the PUE, the one or more VUEs, or a combination thereof. In other designs, the positioning estimate may be broadcasted at block 630 or 730 to the PUE and the one or more VUEs. In yet other designs, the positioning estimate may be multicasted to a particular group of PUEs and/or VUEs (e.g., UEs in a particular location region, such as VUEs and/or PUEs proximate to a sidewalk or a crosswalk where a potential vehicle-to-pedestrian collision is possible, etc.).

Referring to FIGS. 6-7, in some designs, the wireless node may receive, from a given VUE among the one or more VUEs, an on-demand request for the positioning estimate for the at least the PUE, and the transmission of block 630 (or reception of block 730) may be triggered in an on-demand manner based on the on-demand request.

Referring to FIGS. 6-7, in some designs, the wireless node may receive, from a given VUE among the one or more VUEs, a request for a series of positioning estimates for the at least the PUE to be transmitted at a given periodicity, and the transmission of block 630 (or reception of block 730) may correspond to one instance of the requested series of positioning estimates.

Referring to FIGS. 6-7, in some designs, the wireless node may detect a triggering event, and the transmission of block 630 (or reception of block 730) may occur responsive to the detected triggering event. In some designs, the triggering event may be configured by the PUE or VUE(s) to which the positioning estimate is transmitted. In some designs, different targets amongst the PUE and VUE(s) may be associated with different triggering events. In some designs, a triggering event may comprise a variance in newer measurement data relative to older measurement data exceeding a variance threshold (e.g., PUE ranging for PUE or VUE(s) is erratic, so wireless node (e.g., RSU) is asked to provide a more reliable PUE location estimate, or the RS detects the variance on its own and triggers a PUE location report). In some designs, a triggering event may comprise detection of measurement data from the one or more VUEs being associated with the PUE for a first time (e.g., new PUE detected by VUE, which may occur when PUE is just coming into the VUE's FOV such that the wireless node (e.g., RSU) preemptively provides its high accuracy PUE positioning estimate to the VUE). In some designs, the triggering event may be configured via RRC signaling (e.g., RRC configuration message).

Referring to FIGS. 6-7, in some designs, the transmission of block 630 (or reception of block 730) may be performed at a given frequency, whereby the PUE positioning estimate is continually refreshed. In some designs, the respective frequency at which the PUE positioning estimate is refreshed may be based in part upon a set of criteria. For example, PUEs in a high-risk or danger zone associated with a higher likelihood of vehicle-to-pedestrian collisions (e.g., PUEs located in middle of street, on a cross-walk, on a sidewalk, etc.) may trigger a higher frequency of PUE positioning estimate reporting such that their respective locations can be tracked more precisely so as to reduce the possibility of such a collision. Another criterion may comprise PUE trajectory (e.g., a PUE moving towards a high-risk area may be have its frequency increased, while a PUE moving away from a high-risk area, such as into a building, may have its frequency reduced, etc.).

Referring to FIGS. 6-7, in some designs, the transmission of block 630 (or reception of block 730) may be optional or at least delayed from the operations at blocks 610-620 and 710-720. For example, blocks 610-620 and 710-720 may be performed on a continual basis, whereas blocks 630 and 730 are performed in a less frequency and/or event-triggered basis as noted above. In other words, the PUE positioning estimate need not be reported at the same rate at which it is refreshed or tracked at the wireless node (e.g., RSU). In a specific example, a PUE positioning estimate that places the PUE in a safe-zone (e.g., more than 10 meters away from street, etc.) need not be reported, whereas a PUE positioning estimate that places the PUE in a high-risk zone or moving towards a high-risk zone (e.g., within 3 meters away from street, or within 5 meters away from street while moving towards the street at a rate of 1 meter per second, etc.) may trigger the reporting at blocks 630 and 730.

Referring to FIGS. 6-7, in some designs, the transmission of block 630 (or reception of block 730) may trigger a warning to an operator of the respective VUE(s) and/or PUE(s). In some designs, the warning may function as a right-of-way coordination function (e.g., instruct VUE operator to stop vehicle and instruct PUE that cross-walk access is permitted, or instruct VUE operator to drive through cross-walk and instruct PUE that cross-walk access is prohibited, etc.). In some designs, the PUE may be queried as to its movement intentions before a warning is delivered. For example, a PUE can be queried by the wireless node (e.g., RSU) to determine if the PUE operator intends to cross the street, and then takes appropriate action. If the PUE operator does not intend to cross a particular cross-walk, then a warning to the VUE with regard to the PUE collision risk in the cross-walk can be skipped.

Referring to FIGS. 6-7, in some designs, the PUE may be part of a PUE group comprising a plurality of PUEs, whereby a positioning estimate for each PUE in the PUE group is determined and then transmitted to the PUE and/or VUE(s). In some designs, the PUE group corresponds to PUEs in a FOV of a given VUE among the one or more VUEs.

Figure 8:
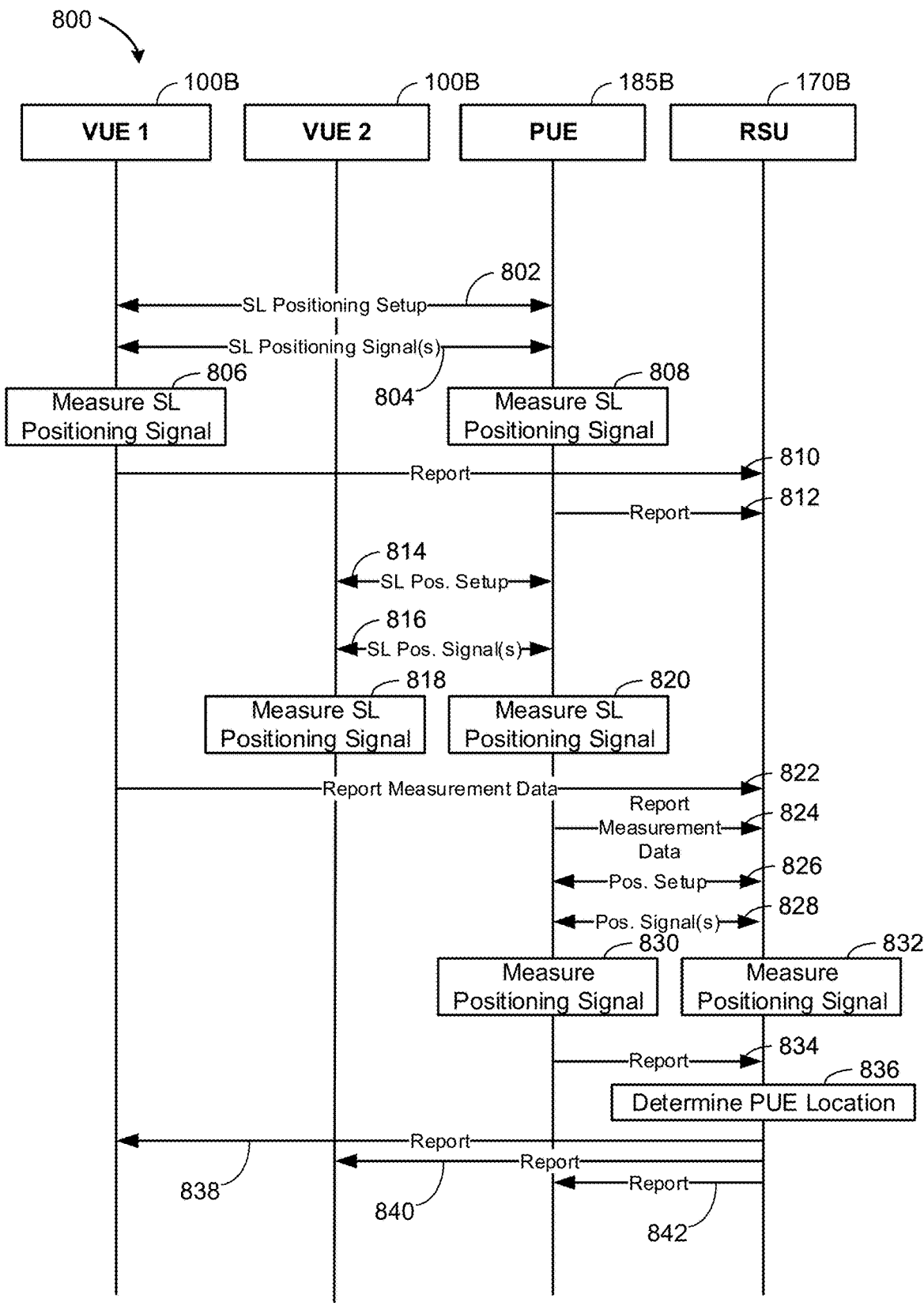
FIG. 8 illustrates an example implementation of the processes of FIGS. 6-7 in accordance with an embodiment of the disclosure.
Figure 9A:
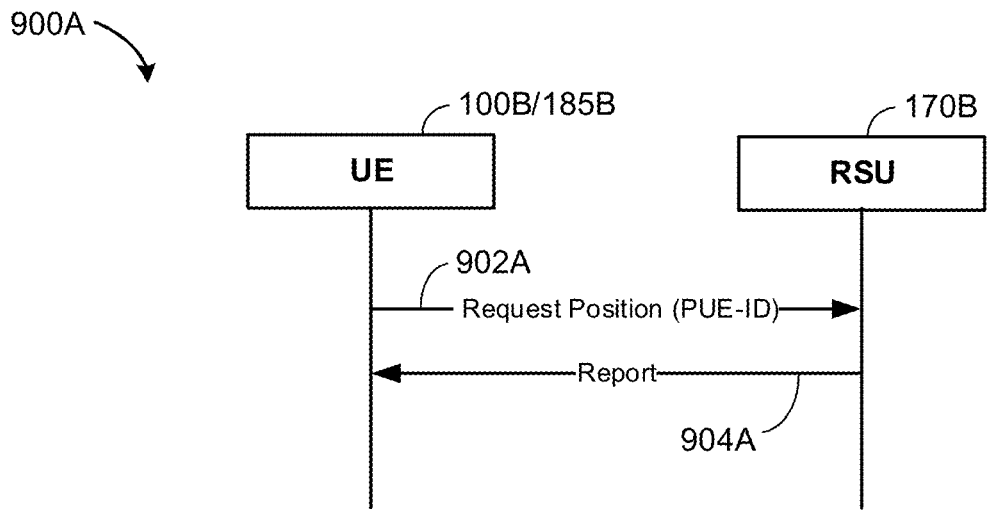
FIG. 9A illustrates an example implementation of part of the processes of FIGS. 6-7 in accordance with an embodiment of the disclosure.
Figure 9B:
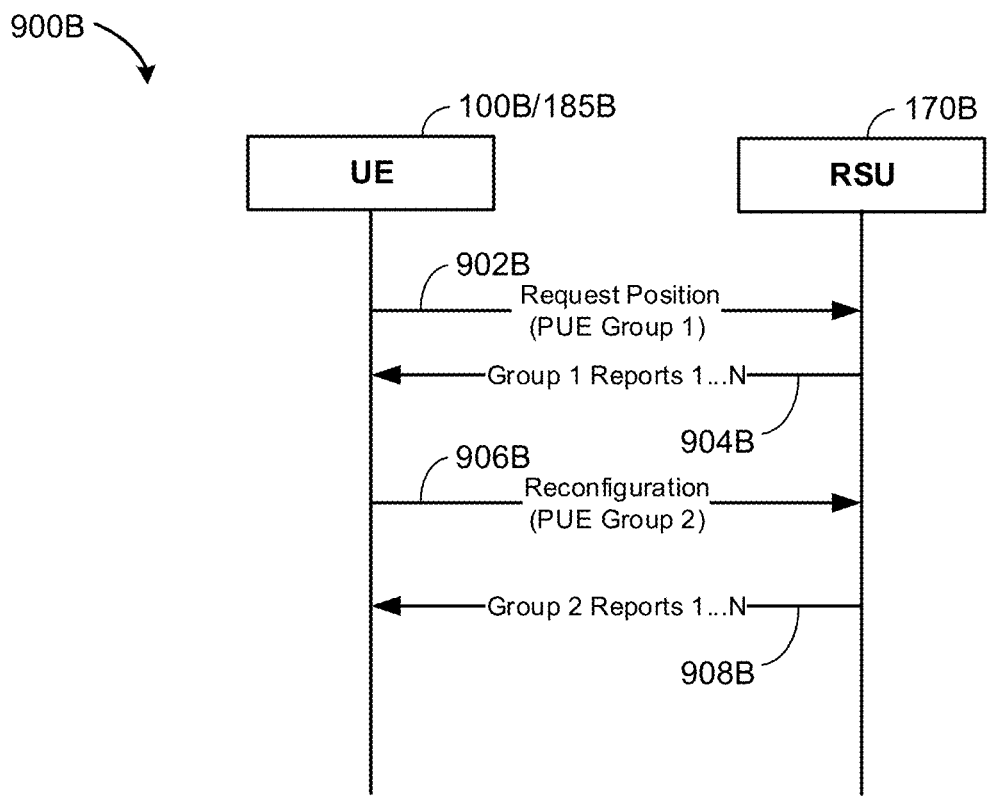
FIG. 9B illustrates an example implementation of part of the processes of FIGS. 6-7 in accordance with an embodiment of the disclosure.

Below, FIGS. 8-9B are described whereby the wireless node of FIGS. 6-7 corresponds to RSU 170B. However, as noted above, in other designs the wireless node may instead correspond to a lead UE, such as a lead PUE or lead VUE (e.g., in scenario where a proximate RSU is not present or is present but unavailable to provide positioning assistance).

FIG. 8 illustrates an example implementation 800 of the processes 600-700 of FIGS. 6-7 in accordance with an embodiment of the disclosure.

At 802, VUE 1 and PUE 1 perform sidelink (SL) positioning setup, whereby either VUE 1 or PUE 1 initiates a positioning request where positioning capability of both entities is exchanged. At 804, the actual SL positioning signals are exchanged. At 806, VUE 1 performs measurement(s) (e.g., ToA, AoA, AoD, click bias error, etc.) on the SL positioning signal from PUE 1. At 808, PUE 1 performs measurement(s) (e.g., ToA, AoA, AoD, click bias error, etc.) on the SL positioning signal from VUE 1. At 810, VUE 1 reports measurement data (e.g., ranging measurement data, etc.) based on the measurements from 806 to RSU 170B. At 812, PUE 1 reports measurement data (e.g., ranging measurement data, etc.) based on the measurements from 808 to RSU 170B.

At 814, VUE 2 and PUE 1 perform SL positioning setup, whereby either VUE 2 or PUE 1 initiates a positioning request where positioning capability of both entities is exchanged. At 816, the actual SL positioning signals are exchanged. At 818, VUE 2 performs measurement(s) (e.g., ToA, AoA, AoD, click bias error, etc.) on the SL positioning signal from PUE 1. At 820, PUE 1 performs measurement(s) (e.g., ToA, AoA, AoD, click bias error, etc.) on the SL positioning signal from VUE 2. At 822, VUE 2 reports measurement data (e.g., ranging measurement data, etc.) based on the measurements from 818 to RSU 170B. At 824, PUE 1 reports measurement data (e.g., ranging measurement data, etc.) based on the measurements from 820 to RSU 170B.

At 826, RSU 185B and PUE 1 perform positioning setup, whereby either RSU 185B or PUE 1 initiates a positioning request where positioning capability of both entities is exchanged. At 828, the actual positioning signals (e.g., PRS, SRS-P, etc.) are exchanged. At 830, PUE 1 performs measurement(s) (e.g., ToA, AoA, AoD, click bias error, etc.) on the positioning signal from PUE 1. At 832, RSU 170B performs measurement(s) (e.g., ToA, AoA, AoD, click bias error, etc.) on the positioning signal from PUE 185B. At 834, PUE 185B reports measurement data (e.g., ranging measurement data, etc.) based on the measurements from 830 to RSU 170B. In some designs, 826-834 are optional. Also, while 826-832 relate in part to measurement data obtained at the RSU 170B in coordination with PUE 1, in other embodiments RSU 170B may also use its own sensors to detect a position of PUE 1 in a manner that does not require such coordination. For example, the RSU 170B may be capable of performing sensor measurements (e.g., RADAR, LIDAR, etc.) to track PUE position and may use this information (at least in part) to determine the positioning estimate of PUE 1. At 836, RSU 170B determines a positioning estimate for PUE 1 based on the various measurement data received from VUEs 1-2 and PUE 1 and/or measured by the RSU 185B itself at 832. Based on various triggering criteria (e.g., on-demand request, event detection, periodic reporting, etc.), RSU 170B transmits the positioning estimate for PUE 1 to VUE 1 at 838, to VUE 2 at 840, and the PUE 1 at 842.

FIG. 9A illustrates an example implementation 900A of part of the processes 600-700 of FIGS. 6-7 in accordance with an embodiment of the disclosure. At 902A, a UE (e.g., PUE or VUE) transmits an on-demand request for a location of a target PUE along with a PUE identifier (PUE-ID) of the target PUE. At 904A, RSU 170B transmits the positioning estimate for the PUE identified by the PUE-ID 1 to the requesting UE. Hence, FIG. 9A demonstrates an example of an on-demand PUE location request for a single PUE. In some designs, the PUE-ID may correspond to a L1 PUE-ID, an L2 PUE-ID, or an L3 PUE-ID. In some designs, 902A is triggered in a scenario where the UE is unable to obtain an accurate location of PUE 1 (e.g., high variance between ranging measurements indicates low accuracy of PUE 1 location, etc.). In some designs, the request at 902A is transmitted via RRC signaling.

FIG. 9B illustrates an example implementation 900B of part of the processes 600-700 of FIGS. 6-7 in accordance with another embodiment of the disclosure. At 902A, a UE (e.g., PUE or VUE) transmits a request for periodic transmission of locations of PUEs in a PUE group 1 (e.g., identified by the individual PUE-IDs or a PUE group identifier). At 904B, RSU 170B transmits the positioning estimates for the PUEs in PUE group 1 to the requesting UE 1 . . . N times in accordance with a given periodicity (e.g., which may be specified in the location request at 902B or dynamically determined at RSU 170B) over a given duration of time (e.g., which may be configurable, e.g., longer if VUE is moving at less than a speed threshold and shorter is VUE is moving more quickly than the speed threshold). At 906B, the UE transmits a reconfiguration request (e.g., changing the PUE membership of PUE group 1, which transforms PUE group 1 to PUE group 2; optionally, also changing the periodicity of transmission). At 908B, RSU 170B transmits the positioning estimates for the PUEs in PUE group 2 to the requesting UE 1 . . . N times in accordance with a given periodicity (e.g., same or different as the periodicity for the transmissions at 904B) over a given duration of time (e.g., which may be configurable, e.g., longer if VUE is moving at less than a speed threshold and shorter is VUE is moving more quickly than the speed threshold). In some designs, in a scenario where the requesting UE is a VUE, the PUE group may track with the PUEs in a FOV of the VUE (e.g., if the VUE has already driven past a PUE, the VUE no longer needs to know the location of that PUE because the PUE is outside of the VUE's path). In some designs, the PUE group can be populated based on PUEs detected at the UE (e.g., based on detection or interception of P2V messages). In some designs, the configuration messages at 902B and/or 906B may be is transmitted via RRC signaling.

Figure 10:
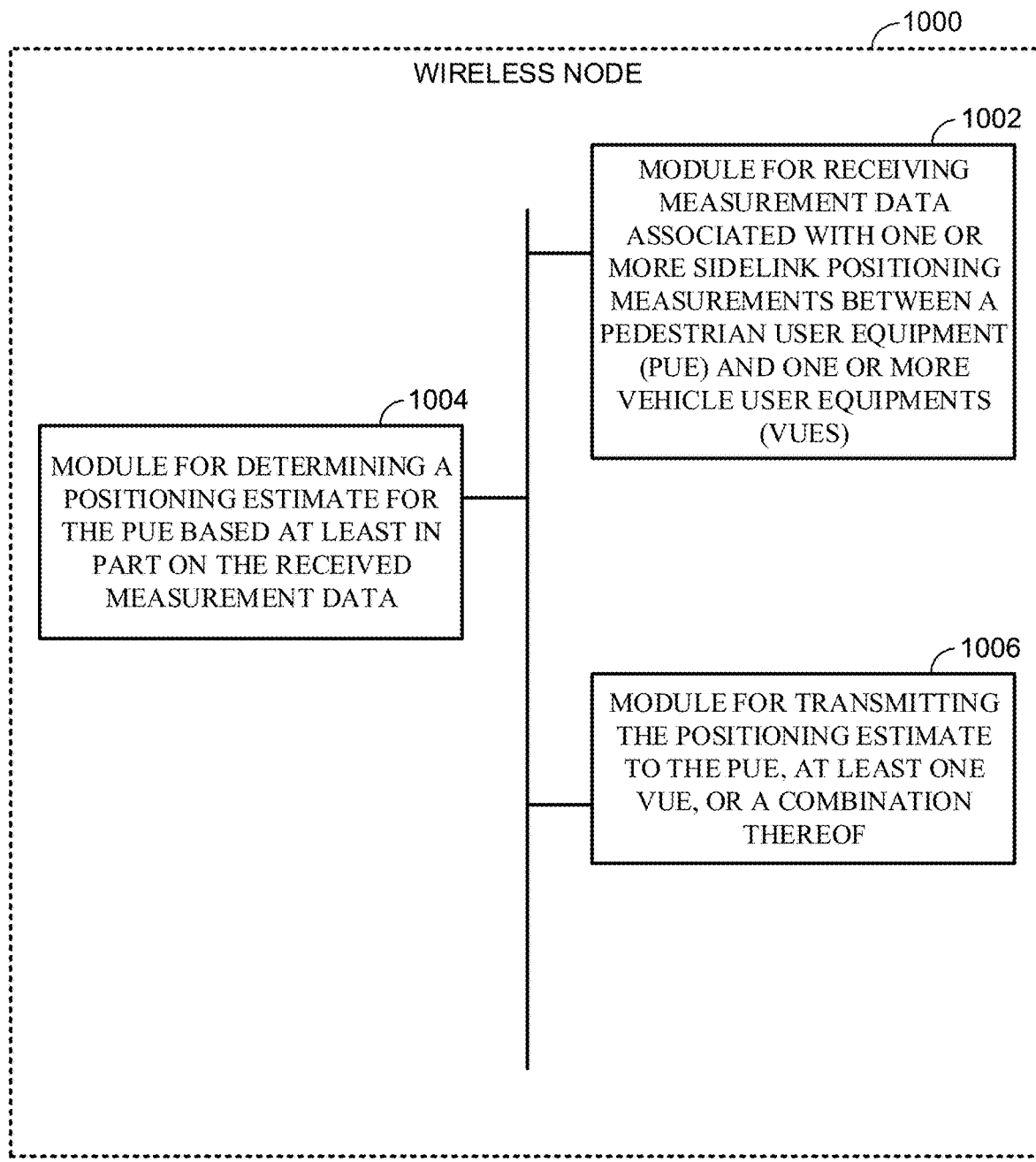
FIG. 10 illustrates an example RSU for implementing the process of FIG. 6 represented as a series of interrelated functional modules in accordance with an aspect of the disclosure.

FIG. 10 illustrates an example wireless node 1000 for implementing the process 600 of FIG. 6 represented as a series of interrelated functional modules in accordance with an aspect of the disclosure. In the illustrated example, the wireless node 1000 includes a module for receiving 1002, a module for determining 1004 and a module for transmitting 1006.

The module for receiving 1002 may be configured to receive measurement data associated with one or more sidelink positioning measurements between a PUE and one or more VUEs (e.g., 610 of FIG. 6). The module for determining 1004 may be configured to determine a positioning estimate for the PUE based at least in part on the received measurement data (e.g., 620 of FIG. 6). The module for transmitting 1006 may be configured to transmit the positioning estimate to the PUE, at least one VUE, or a combination thereof (e.g., 630 of FIG. 6).

Figure 11:
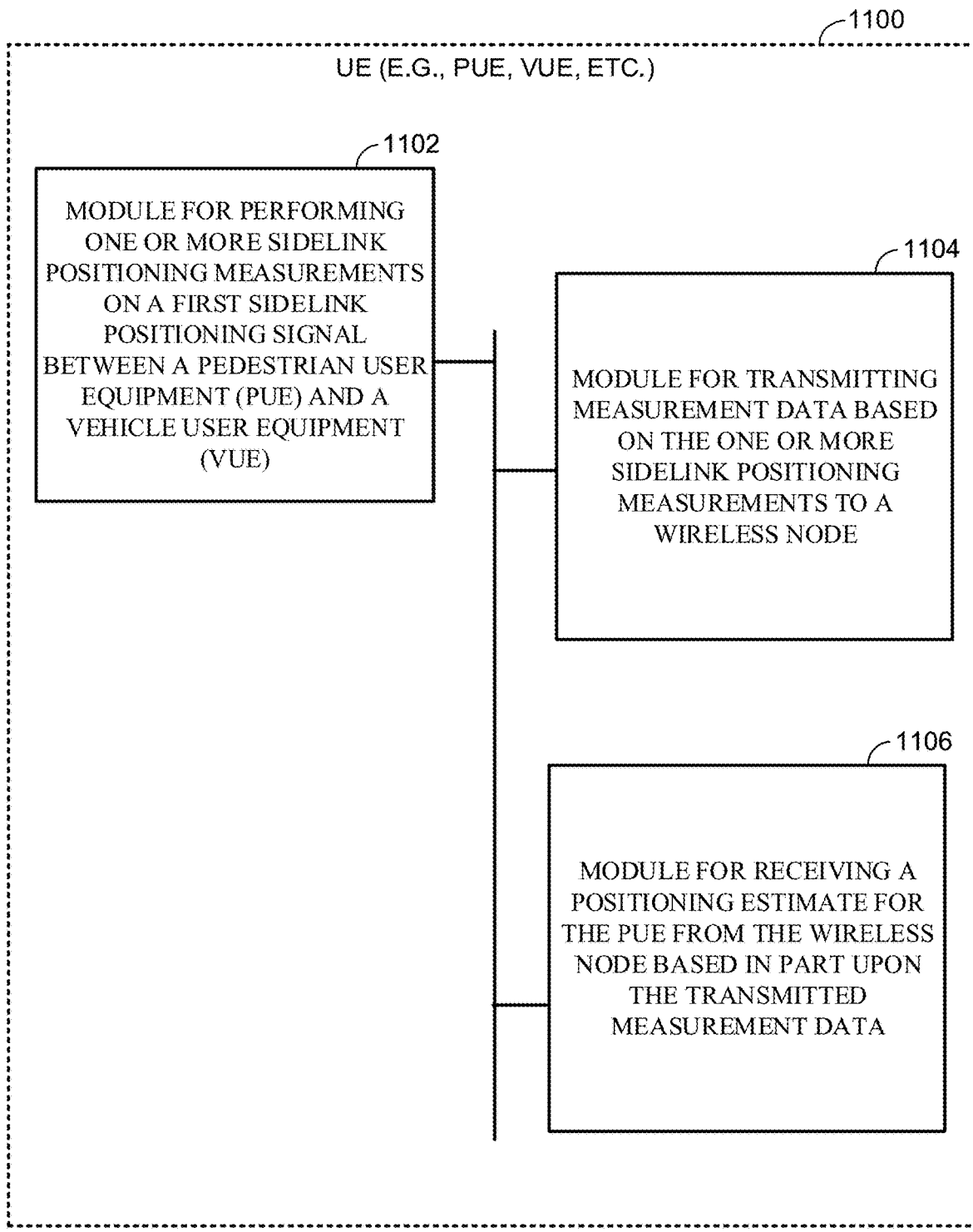
FIG. 11 illustrates an example UE for implementing the process of FIG. 7 represented as a series of interrelated functional modules in accordance with an aspect of the disclosure.

FIG. 11 illustrates an example UE 1100 (e.g., VUE, PUE, etc.) for implementing the process 700 of FIG. 7 represented as a series of interrelated functional modules in accordance with an aspect of the disclosure. In the illustrated example, the UE 1100 includes a module for performing 1102, a module for transmitting 1104 and a module for receiving 1106.

The module for performing 1102 may be configured to perform one or more sidelink positioning measurements on a first sidelink positioning signal between a PUE and a VUE (e.g., 710 of FIG. 7). The means for transmitting 1104 may be configured to transmit measurement data based on the one or more sidelink positioning measurements to a wireless node (e.g., 720 of FIG. 7). The means for receiving 1106 may be configured to receive a positioning estimate for the PUE from the wireless node based in part upon the transmitted measurement data (e.g., 730 of FIG. 7).

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 10-11 may include code for performing a LOAD operation, a COMPARE operation, a RETURN operation, an IF-THEN-ELSE loop, and so on.

Process 600 may include additional implementations, such as any single implementation or any combination of implementations described below and/or in connection with one or more other processes described elsewhere herein.

In a first implementation, the transmitting transmits the positioning estimate via one or more unicast messages to the PUE, the one or more VUEs, or a combination thereof, or wherein the transmitting broadcasts the positioning estimate to the PUE and the one or more VUEs.

In a second implementation, alone or in combination with the first implementation, process 600 includes receiving, from a given VUE among the one or more VUEs, an on-demand request for the positioning estimate for the at least the PUE, wherein the transmitting is triggered in response to the on-demand request.

In a third implementation, alone or in combination with one or more of the first and second implementations, process 600 includes receiving, from a given VUE among the one or more VUEs, a request for a series of positioning estimates for the at least the PUE to be transmitted at a given periodicity, wherein the transmitting transmits the positioning estimate as part of the requested series of positioning estimates.

In a fourth implementation, alone or in combination with one or more of the first through third implementations, process 600 includes detecting a triggering event, wherein the transmitting transmits the positioning estimate in response to the detected triggering event.

In a fifth implementation, alone or in combination with one or more of the first through fourth implementations, the triggering event comprises a variance in newer measurement data relative to older measurement data exceeding a variance threshold, or wherein the triggering event comprises the measurement data from the one or more VUEs being associated with the PUE for a first time.

In a sixth implementation, alone or in combination with one or more of the first through fifth implementations, the PUE is part of a PUE group comprising a plurality of PUEs, and wherein the receiving, the determining, and the transmitting is performed for each PUE in the PUE group.

In a seventh implementation, alone or in combination with one or more of the first through sixth implementations, the PUE group corresponds to PUEs in a field of view (FOV) of a given VUE among the one or more VUEs.

In an eighth implementation, alone or in combination with one or more of the first through seventh implementations, process 600 includes transmitting a positioning signal to the PUE, wherein the measurement data further includes measurement information associated with one or more measurements of the positioning signal by the PUE.

In a ninth implementation, alone or in combination with one or more of the first through eighth implementations, process 600 includes performing one or more positioning measurements on a positioning signal from the PUE, wherein the positioning estimate is further based on the one or more positioning measurement on the positioning signal.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In a first implementation, the UE corresponds to the PUE, and wherein the first sidelink positioning signal is received at the PUE from the VUE.

In a second implementation, alone or in combination with the first implementation, process 700 includes transmitting a second sidelink positioning signal to the VUE, wherein the positioning estimate is further based on one or more second measurements performed on the second sidelink positioning signal by the VUE.

In a third implementation, alone or in combination with one or more of the first and second implementations, the UE corresponds to the VUE, and wherein the first sidelink positioning signal is received at the VUE from the PUE.

In a fourth implementation, alone or in combination with one or more of the first through third implementations, process 700 includes transmitting a second sidelink positioning signal to the PUE, wherein the positioning estimate is further based on one or more second measurements performed on the second sidelink positioning signal by the PUE.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying the methods described herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a wireless node, comprising:
receiving one or more measurement reports comprising measurement data based on one or more sidelink positioning measurements between a pedestrian user equipment (PUE) and one or more vehicle user equipments (VUEs) as measured by the PUE, the one or more VUEs, or both;
determining a positioning estimate for the PUE based at least in part on the received measurement data; and
transmitting the positioning estimate to the PUE, at least one VUE, or a combination thereof.

2. The method of claim 1,
wherein the positioning estimate is transmitted via one or more unicast messages to the PUE, the one or more VUEs, or a combination thereof, or
wherein the positioning estimate is broadcast to the PUE and the one or more VUEs.

3. The method of claim 1, further comprising:
receiving, from a given VUE among the one or more VUEs, an on-demand request for the positioning estimate for the at least the PUE,
wherein the transmission is triggered in response to the on-demand request.

4. The method of claim 1, further comprising:
receiving, from a given VUE among the one or more VUEs, a request for a series of positioning estimates for the at least the PUE to be transmitted at a given periodicity,
wherein the positioning estimate is transmitted as part of the requested series of positioning estimates.

5. The method of claim 1, further comprising:
detecting a triggering event,
wherein the positioning estimate is transmitted in response to the detected triggering event.

6. The method of claim 5,
wherein the triggering event comprises a variance in newer measurement data relative to older measurement data exceeding a variance threshold, or
wherein the triggering event comprises the measurement data from the one or more VUEs being associated with the PUE for a first time.

7. The method of claim 1,
wherein the PUE is part of a PUE group comprising a plurality of PUEs, and
wherein a respective positioning estimate is determined for each PUE in the PUE group based on the one or more sidelink positioning measurements.

8. The method of claim 7, wherein the PUE group corresponds to PUEs in a field of view (FOV) of a given VUE among the one or more VUEs.

9. The method of claim 1, further comprising:
transmitting a positioning signal to the PUE,
wherein the measurement data further includes measurement information associated with one or more measurements of the positioning signal by the PUE.

10. The method of claim 1, further comprising:
performing one or more positioning measurements on a positioning signal from the PUE,
wherein the positioning estimate is further based on the one or more positioning measurement on the positioning signal.

11. The method of claim 1, wherein the wireless node corresponds to a roadside unit (RSU), a lead PUE, or a lead VUE.

12. The method of claim 1, wherein the wireless node corresponds to a roadside unit (RSU).

13. A method of operating a user equipment (UE), comprising:
performing one or more sidelink positioning measurements on a first sidelink positioning signal between a pedestrian user equipment (PUE) and a vehicle user equipment (UE);
transmitting one or more measurement reports comprising measurement data based on the one or more sidelink positioning measurements to a wireless node; and
receiving a positioning estimate for the PUE from the wireless node based in part upon the transmitted measurement data.

14. The method of claim 13,
wherein the UE corresponds to the PUE, and
wherein the first sidelink positioning signal is received at the PUE from the VUE.

15. The method of claim 14, further comprising:
transmitting a second sidelink positioning signal to the VUE,
wherein the positioning estimate is further based on one or more second measurements performed on the second sidelink positioning signal by the VUE.

16. The method of claim 13,
wherein the UE corresponds to the VUE, and
wherein the first sidelink positioning signal is received at the VUE from the PUE.

17. The method of claim 16, further comprising:
transmitting a second sidelink positioning signal to the PUE,
wherein the positioning estimate is further based on one or more second measurements performed on the second sidelink positioning signal by the PUE.

18. The method of claim 13, wherein the wireless node corresponds to a roadside unit (RSU), a lead PUE, or a lead VUE.

19. A non-transitory computer-readable medium storing a set of instructions, the set of instructions comprising one or more instructions that, when executed by one or more processors of a wireless node, cause the wireless node to:
receive one or more measurement reports comprising measurement data based on one or more sidelink positioning measurements between a pedestrian user equipment (PUE) and one or more vehicle user equipments (VUEs) as measured by the PUE, the one or more VUEs, or both;

determine a positioning estimate for the PUE based at least in part on the received measurement data; and
transmit the positioning estimate to the PUE, at least one VUE, or a combination thereof.

20. The non-transitory computer-readable medium of claim 19,
wherein the positioning estimate is transmitted via one or more unicast messages to the PUE, the one or more VUEs, or a combination thereof, or
wherein the positioning estimate is broadcast to the PUE and the one or more VUEs.

21. The non-transitory computer-readable medium of claim 19, wherein the one or more instructions further cause the wireless node to:
receive, from a given VUE among the one or more VUEs, an on-demand request for the positioning estimate for the at least the PUE,
wherein the transmission is triggered in response to the on-demand request.

22. The non-transitory computer-readable medium of claim 19, wherein the one or more instructions further cause the wireless node to:
receive, from a given VUE among the one or more VUEs, a request for a series of positioning estimates for the at least the PUE to be transmitted at a given periodicity,
wherein the positioning estimate is transmitted as part of the requested series of positioning estimates.

23. The non-transitory computer-readable medium of claim 19, wherein the one or more instructions further cause the wireless node to:
detect a triggering event,
wherein the positioning estimate is transmitted in response to the detected triggering event.

24. The non-transitory computer-readable medium of claim 23,
wherein the triggering event comprises a variance in newer measurement data relative to older measurement data exceeding a variance threshold, or
wherein the triggering event comprises the measurement data from the one or more VUEs being associated with the PUE for a first time.

25. The non-transitory computer-readable medium of claim 19,
wherein the PUE is part of a PUE group comprising a plurality of PUEs, and
wherein a respective positioning estimate is determined for each PUE in the PUE group based on the one or more sidelink positioning measurements.

26. The non-transitory computer-readable medium of claim 25, wherein the PUE group corresponds to PUEs in a field of view (FOV) of a given VUE among the one or more VUEs.

27. The non-transitory computer-readable medium of claim 19, wherein the one or more instructions further cause the wireless node to:
transmit a positioning signal to the PUE,
wherein the measurement data further includes measurement information associated with one or more measurements of the positioning signal by the PUE.

28. The non-transitory computer-readable medium of claim 19, wherein the one or more instructions further cause the wireless node to:
perform one or more positioning measurements on a positioning signal from the PUE,
wherein the positioning estimate is further based on the one or more positioning measurement on the positioning signal.

29. The non-transitory computer-readable medium of claim 19, wherein the wireless node corresponds to a roadside unit (RSU), a lead PUE, or a lead VUE.

30. A non-transitory computer-readable medium storing a set of instructions, the set of instructions comprising one or more instructions that, when executed by one or more processors of a user equipment (UE), cause the UE to:
perform one or more sidelink positioning measurements on a first sidelink positioning signal between a pedestrian user equipment (PUE) and a vehicle user equipment (UE);
transmit one or more measurement reports comprising measurement data based on the one or more sidelink positioning measurements to a wireless node; and
receive a positioning estimate for the PUE from the wireless node based in part upon the transmitted measurement data.

31. The non-transitory computer-readable medium of claim 30,
wherein the UE corresponds to the PUE, and
wherein the first sidelink positioning signal is received at the PUE from the VUE.

32. The non-transitory computer-readable medium of claim 31, wherein the one or more instructions further cause the UE to:
transmit a second sidelink positioning signal to the VUE,
wherein the positioning estimate is further based on one or more second measurements performed on the second sidelink positioning signal by the VUE.

33. The non-transitory computer-readable medium of claim 30,
wherein the UE corresponds to the VUE, and
wherein the first sidelink positioning signal is received at the VUE from the PUE.

34. The non-transitory computer-readable medium of claim 30, wherein the one or more instructions further cause the UE to:
transmit a second sidelink positioning signal to the PUE,
wherein the positioning estimate is further based on one or more second measurements performed on the second sidelink positioning signal by the PUE.

35. The non-transitory computer-readable medium of claim 30, wherein the wireless node corresponds to a roadside unit (RSU), a lead PUE, or a lead VUE.

36. A wireless node, comprising:
one or more memories;
one or more processors, communicatively coupled to the one or more memories, configured to:
receive one or more measurement reports comprising measurement data based on one or more sidelink positioning measurements between a pedestrian user equipment (PUE) and one or more vehicle user equipments (VUEs) as measured by the PUE, the one or more VUEs, or both;
determine a positioning estimate for the PUE based at least in part on the received measurement data; and
transmit the positioning estimate to the PUE, at least one VUE, or a combination thereof.

37. The wireless node of claim 36,
wherein the positioning estimate is transmitted via one or more unicast messages to the PUE, the one or more VUEs, or a combination thereof, or
wherein the positioning estimate is broadcast to the PUE and the one or more VUEs.

38. The wireless node of claim 36, wherein the one or more processors are further configured to:

receive, from a given VUE among the one or more VUEs, an on-demand request for the positioning estimate for the at least the PUE,
wherein the transmission is triggered in response to the on-demand request.

39. The wireless node of claim 36, wherein the one or more processors are further configured to:
receive, from a given VUE among the one or more VUEs, a request for a series of positioning estimates for the at least the PUE to be transmitted at a given periodicity,
wherein the positioning estimate is transmitted as part of the requested series of positioning estimates.

40. The wireless node of claim 36, wherein the one or more processors are further configured to:
detect a triggering event,
wherein the positioning estimate is transmitted in response to the detected triggering event.

41. The wireless node of claim 40,
wherein the triggering event comprises a variance in newer measurement data relative to older measurement data exceeding a variance threshold, or
wherein the triggering event comprises the measurement data from the one or more VUEs being associated with the PUE for a first time.

42. The wireless node of claim 36,
wherein the PUE is part of a PUE group comprising a plurality of PUEs, and
wherein a respective positioning estimate is determined for each PUE in the PUE group based on the one or more sidelink positioning measurements.

43. The wireless node of claim 42, wherein the PUE group corresponds to PUEs in a field of view (FOV) of a given VUE among the one or more VUEs.

44. The wireless node of claim 36, wherein the one or more processors are further configured to:
transmit a positioning signal to the PUE,
wherein the measurement data further includes measurement information associated with one or more measurements of the positioning signal by the PUE.

45. The wireless node of claim 36, wherein the one or more processors are further configured to:
perform one or more positioning measurements on a positioning signal from the PUE,
wherein the positioning estimate is further based on the one or more positioning measurement on the positioning signal.

46. The wireless node of claim 36, wherein the wireless node corresponds to a roadside unit (RSU), a lead PUE, or a lead VUE.

47. A user equipment (UE), comprising:
one or more memories;
one or more processors, communicatively coupled to the one or more memories, configured to:
perform one or more sidelink positioning measurements on a first sidelink positioning signal between a pedestrian user equipment (PUE) and a vehicle user equipment (UE);
transmit one or more measurement reports comprising measurement data based on the one or more sidelink positioning measurements to a wireless node; and
receive a positioning estimate for the PUE from the wireless node based in part upon the transmitted measurement data.

48. The UE of claim 47,
wherein the UE corresponds to the PUE, and
wherein the first sidelink positioning signal is received at the PUE from the VUE.

49. The UE of claim 48, wherein the one or more processors are further configured to:
transmit a second sidelink positioning signal to the VUE,
wherein the positioning estimate is further based on one or more second measurements performed on the second sidelink positioning signal by the VUE.

50. The UE of claim 47,
wherein the UE corresponds to the VUE, and
wherein the first sidelink positioning signal is received at the VUE from the PUE.

51. The UE of claim 50, wherein the one or more processors are further configured to:
transmit a second sidelink positioning signal to the PUE,
wherein the positioning estimate is further based on one or more second measurements performed on the second sidelink positioning signal by the PUE.

52. The UE of claim 47, wherein the wireless node corresponds to a roadside unit (RSU), a lead PUE, or a lead VUE.

53. A wireless node, comprising:
means for receiving one or more measurement reports comprising measurement data based on one or more sidelink positioning measurements between a pedestrian user equipment (PUE) and one or more vehicle user equipments (VUEs) as measured by the PUE, the one or more VUEs, or both;
means for determining a positioning estimate for the PUE based at least in part on the received measurement data; and
means for transmitting the positioning estimate to the PUE, at least one VUE, or a combination thereof.

54. The wireless node of claim 53,
wherein the positioning estimate is transmitted via one or more unicast messages to the PUE, the one or more VUEs, or a combination thereof, or
wherein the positioning estimate is broadcast to the PUE and the one or more VUEs.

55. The wireless node of claim 53, further comprising:
means for receiving, from a given VUE among the one or more VUEs, an on-demand request for the positioning estimate for the at least the PUE,
wherein the transmission is triggered in response to the on-demand request.

56. The wireless node of claim 53, further comprising:
means for receiving, from a given VUE among the one or more VUEs, a request for a series of positioning estimates for the at least the PUE to be transmitted at a given periodicity,
wherein the positioning estimate is transmitted as part of the requested series of positioning estimates.

57. The wireless node of claim 53, further comprising:
means for detecting a triggering event,
wherein the positioning estimate is transmitted in response to the detected triggering event.

58. The wireless node of claim 57,
wherein the triggering event comprises a variance in newer measurement data relative to older measurement data exceeding a variance threshold, or
wherein the triggering event comprises the measurement data from the one or more VUEs being associated with the PUE for a first time.

59. The wireless node of claim 53,
wherein the PUE is part of a PUE group comprising a plurality of PUEs, and
wherein a respective positioning estimate is determined for each PUE in the PUE group based on the one or more sidelink positioning measurements.

60. The wireless node of claim 59, wherein the PUE group corresponds to PUEs in a field of view (FOV) of a given VUE among the one or more VUEs.

61. The wireless node of claim 53, further comprising:
means for transmitting a positioning signal to the PUE,
wherein the measurement data further includes measurement information associated with one or more measurements of the positioning signal by the PUE.

62. The wireless node of claim 53, further comprising:
means for performing one or more positioning measurements on a positioning signal from the PUE,
wherein the positioning estimate is further based on the one or more positioning measurement on the positioning signal.

63. The wireless node of claim 53, wherein the wireless node corresponds to a roadside unit (RSU), a lead PUE, or a lead VUE.

64. A user equipment (UE), comprising:
means for performing one or more sidelink positioning measurements on a first sidelink positioning signal between a pedestrian user equipment (PUE) and a vehicle user equipment (UE);
means for transmitting one or more measurement reports comprising measurement data based on the one or more sidelink positioning measurements to a wireless node; and
means for receiving a positioning estimate for the PUE from the wireless node based in part upon the transmitted measurement data.

65. The UE of claim 64,
wherein the UE corresponds to the PUE, and
wherein the first sidelink positioning signal is received at the PUE from the VUE.

66. The UE of claim 65, further comprising:
means for transmitting a second sidelink positioning signal to the VUE,
wherein the positioning estimate is further based on one or more second measurements performed on the second sidelink positioning signal by the VUE.

67. The UE of claim 64,
wherein the UE corresponds to the VUE, and
wherein the first sidelink positioning signal is received at the VUE from the PUE.

68. The UE of claim 67, further comprising:
means for transmitting a second sidelink positioning signal to the PUE,
wherein the positioning estimate is further based on one or more second measurements performed on the second sidelink positioning signal by the PUE.

69. The wireless node of claim 64, wherein the wireless node corresponds to a roadside unit (RSU), a lead PUE, or a lead VUE.

* * * * *